(12) United States Patent
Bi et al.

(10) Patent No.: US 12,510,419 B2
(45) Date of Patent: Dec. 30, 2025

(54) INTERNAL HEAT-GENERATING COMPONENT NOISE CORRECTION TECHNIQUES FOR TEMPERATURE SENSOR SYSTEMS

(71) Applicant: Apple Inc., Cupertino, CA (US)

(72) Inventors: Han Bi, Santa Clara, CA (US); Habib S. Karaki, Sunnyvale, CA (US); Zachary Gaubert, Austin, TX (US); Jiandong Yu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 420 days.

(21) Appl. No.: 18/325,804

(22) Filed: May 30, 2023

(65) Prior Publication Data
US 2023/0392990 A1    Dec. 7, 2023

Related U.S. Application Data

(60) Provisional application No. 63/365,943, filed on Jun. 6, 2022.

(51) Int. Cl.
*G01K 1/02* (2021.01)
*G01K 1/20* (2006.01)

(52) U.S. Cl.
CPC ............... *G01K 1/20* (2013.01); *G01K 1/026* (2013.01)

(58) Field of Classification Search
CPC .......... G01K 1/026; G01K 1/20; G01K 7/021; G01K 7/04; G01K 7/20; G01K 7/427; G01K 13/143; G01K 13/20
See application file for complete search history.

(56) References Cited

U.S. PATENT DOCUMENTS

| | | | |
|---|---|---|---|
| 10,409,301 B2* | 9/2019 | Ishii | G05D 23/1917 |
| 10,463,300 B2 | 11/2019 | Kahn et al. | |
| 10,942,067 B2* | 3/2021 | Pan | G06F 1/206 |
| 11,426,079 B1* | 8/2022 | Sunden | G16H 50/30 |
| 2017/0351279 A1* | 12/2017 | Ishii | G06F 3/0679 |
| 2018/0136051 A1* | 5/2018 | Ishii | G01K 1/20 |
| 2019/0227022 A1 | 7/2019 | Harley-trochimczyk et al. | |
| 2020/0301487 A1* | 9/2020 | Bamba | G05D 23/1917 |
| 2020/0335211 A1 | 10/2020 | Gopalakrishnan | |
| 2023/0098236 A1* | 3/2023 | Tadele | G01K 7/021 374/29 |
| 2023/0099531 A1* | 3/2023 | Tadele | G01K 7/02 374/30 |
| 2023/0099638 A1* | 3/2023 | Clements | G01K 17/00 374/126 |
| 2023/0332960 A1* | 10/2023 | Tadele | G01K 1/20 |
| 2023/0341275 A1* | 10/2023 | Lee | G01K 7/427 |

* cited by examiner

*Primary Examiner* — Amir A Jalali
(74) *Attorney, Agent, or Firm* — Kubota & Basol LLP

(57) ABSTRACT

An internal heat-generating component noise correction technique can be used to improve accuracy of temperature sensing. In some examples, a method includes at an electronic device including a first temperature sensor and a first heat-generating component, measuring a first temperature using the first temperature sensor, and in accordance with a determination that one or more criteria are satisfied, compensating the first temperature based on a first estimate of heat generated by the first heat-generating component to generate a second temperature, and estimating a third temperature external to the electronic device using the second temperature.

20 Claims, 8 Drawing Sheets

INTERNAL HEAT-GENERATING COMPONENT NOISE CORRECTION TECHNIQUES FOR TEMPERATURE SENSOR SYSTEMS

CROSS-REFERENCE TO RELATED APPLICATIONS

This application claims the benefit of U.S. Provisional Application No. 63/365,943, filed Jun. 6, 2022, the content of which is incorporated herein by reference in its entirety for all purposes.

FIELD OF THE DISCLOSURE

This relates generally to temperature sensing systems and methods, and more particularly, to aggressor noise correction techniques.

BACKGROUND OF THE DISCLOSURE

Many types of temperature sensing devices are used to detect temperature measurements. These temperature sensing devices may be used to detect a temperature of an object or of a person.

SUMMARY OF THE DISCLOSURE

Many types of temperature system sensing devices can be used to detect temperature measurements. Sometimes, temperature sensing systems are integrated into an electronic device that performs other operations (e.g., display operations, touch sensing operations, wireless communication operations), in addition to temperature sensing operations. Operations on the electronic device may be performed by components of the electronic device. For example, a display operation may involve a processor of the electronic device executing processor-executable instructions to display a graphical user interface (GUI). As the processor executes the processor-executable instructions, the processor may dissipate thermal energy. This dissipated thermal energy may influence measurements acquired by a temperature sensing system on the electronic device. For example, the thermal energy may cause a temperature measurement to fluctuate based on the thermal energy, and further, may cause a temperature measurement to be an inaccurate temperature measurement due to the aggressor noise (e.g., from the processor). Thus, an internal heat-generating component noise correction technique for compensating temperature measurements acquired by temperature sensor systems is needed.

The present examples relate to aggressor noise correction techniques for compensating temperature measurements on electronic device. An electronic device can leverage measurements from multiple sensors to estimate temperatures inside and outside of the electronic device. In some examples, an electronic device estimates the temperature of the surrounding air (e.g., ambient air temperature) using measurements from sensors within the device. In some examples, an electronic device estimates the temperature of objects (e.g., skin or body temperature) contacting one or more of its surfaces (e.g., a rear surface of the device, a front surface, etc.). In some examples, the electronic device estimates a temperature and/or thermal energy from a component internal to the electronic device to compensate for aggressor noise present in a temperature measurement of a temperature external to the electronic device.

DETAILED DESCRIPTION

Figure 1A:
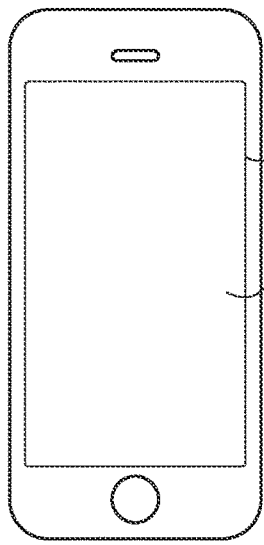
FIG. 1A illustrates an electronic device with a temperature sensing system that utilizes an internal heat-generating component noise correction technique for estimating measurements acquired by the temperature sensing system, in accordance with some examples of the present disclosure.

In the following description of examples, reference is made to the accompanying drawings which form a part hereof, and in which it is shown by way of illustration specific examples that are optionally practiced. It is to be understood that other examples are optionally used and structural changes are optionally made without departing from the scope of the disclosed examples.

Many types of temperature system sensing devices can be used to detect temperature measurements. Sometimes, temperature sensing systems are integrated into an electronic device that performs other operations (e.g., display operations, touch sensing operations, wireless communication operations), in addition to temperature sensing operations. Operations on the electronic device may be performed by components of the electronic device. For example, a display operation may involve a processor of the electronic device executing processor-executable instructions to display a graphical user interface (GUI). As the processor executes the processor-executable instructions, the processor may generate (or dissipate) thermal energy (also referred to as "heat"). This thermal energy may influence measurements acquired by a temperature sensing system on the electronic device. For example, the thermal energy may cause a temperature measurement to fluctuate, and further, may cause a temperature measurement to be an inaccurate temperature measurement. Thus, the thermal energy from the processor can be viewed as introducing noise into the temperature measurements. The noise from internal heat-generating components is also referred to herein as "aggressor noise" or "heat-generating component noise." Thus, an internal heat-generating component noise correction technique for compensating temperature measurements acquired by temperature sensor systems is needed.

The present examples relate to aggressor noise correction techniques for compensating temperature measurements on electronic device. An electronic device can leverage measurements from multiple sensors to estimate temperatures inside and outside of the electronic device. In some examples, an electronic device estimates the temperature of the surrounding air (e.g., ambient air temperature) using measurements from sensors within the device. In some examples, an electronic device estimates the temperature of objects (e.g., skin or body temperature) contacting one or more of its surfaces (e.g., a rear surface of the device, a front surface, etc.). In some examples, the electronic device estimates a temperature and/or thermal energy from a component internal to the electronic device to compensate for aggressor noise present in a temperature measurement of a temperature external to the electronic device. As used herein, the term "or" includes the inclusive "or".

FIGS. 1A-1G illustrate electronic devices with temperature sensing systems utilize an internal heat-generating component noise correction technique for estimating measurements acquired by the temperature sensing systems, in accordance with some examples of the present disclosure. It is understood that the heat-generating component noise correction techniques disclosed with reference to FIGS. 3-7 are optionally adaptable to the example electronic devices described with reference to FIGS. 1A-1G (e.g., to account for the different numbers and arrangements of temperature sensors and heat-generating components).

FIG. 1A illustrates a mobile telephone 136 that includes a touch screen 124. The mobile telephone 136 includes a temperature sensing system that utilizes the internal heat-generating component noise correction technique for estimating measurements acquired by the temperature sensing system, in accordance with some examples of the present disclosure.

Figure 1B:
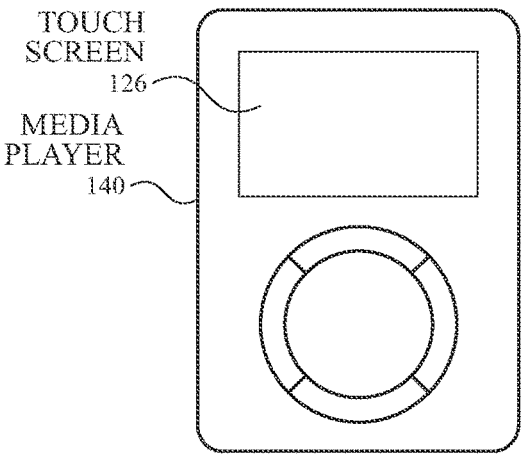
FIG. 1B illustrates an electronic device with a temperature sensing system that utilizes the internal heat-generating component noise correction technique, in accordance with some examples of the present disclosure.

FIG. 1B illustrates a media player 140 (e.g., a digital media player) that includes a touch screen 126. The media player 140 includes a temperature sensing system that utilizes the internal heat-generating component noise correction technique, in accordance with some examples of the present disclosure.

Figure 1C:
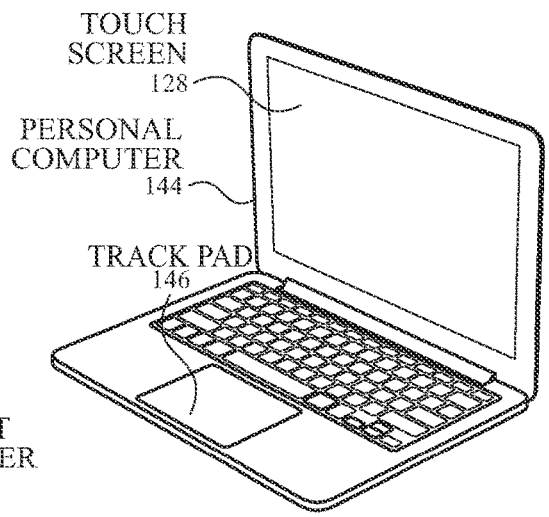
FIG. 1C illustrates an electronic device with a temperature sensing system that utilizes the internal heat-generating component noise correction technique, in accordance with some examples of the present disclosure.

FIG. 1C illustrates a personal computer 144 that includes a touch screen 128 and a track pad 146. The personal computer 144 includes a temperature sensing system that utilizes the internal heat-generating component noise correction technique, in accordance with some examples of the present disclosure.

Figure 1D:
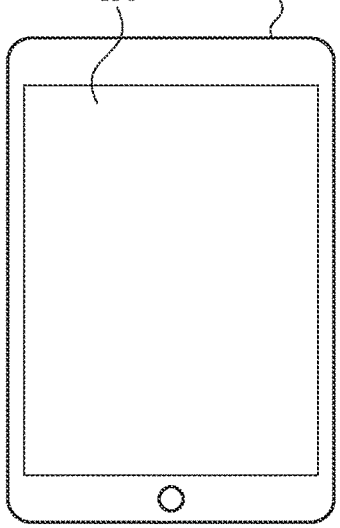
FIG. 1D illustrates an electronic device with a temperature sensing system that utilizes the internal heat-generating component noise correction technique, in accordance with some examples of the present disclosure.

FIG. 1D illustrates a tablet computer 148 that includes a touch screen 130. The tablet computer 148 includes a temperature sensing system that utilizes the internal heat-generating component noise correction technique, in accordance with some examples of the present disclosure.

In some examples, the temperature sensing system within the mobile telephone 136, the media player 140, the personal computer 144, or the tablet computer 148 may measure temperatures associated with touch screens 124, 126, 128, 130, or with track pad 146 (e.g., temperatures inside these devices, temperatures outside these device, temperatures of surfaces contacting or in proximity to the touch screen or track pad of these devices, etc.).

Figure 1E:
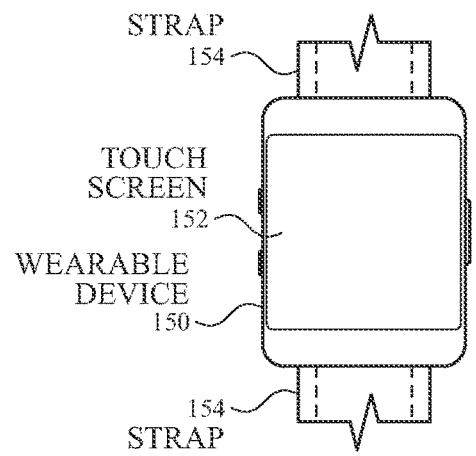
FIG. 1E illustrates an electronic device with a temperature sensing system that utilizes the internal heat-generating component noise correction technique, in accordance with some examples of the present disclosure.

FIG. 1E illustrates a wearable device 150 (e.g., a watch) that includes a touch screen 152. The wearable device 150 includes a coupling mechanism (e.g., a strap 154, a suitable fastener) for coupling the wearable device 150 to a user of the wearable device 150. The wearable device 150 includes a temperature sensing system that utilizes the internal heat-generating component noise correction technique, in accordance with some examples of the present disclosure.

Figure 1F:
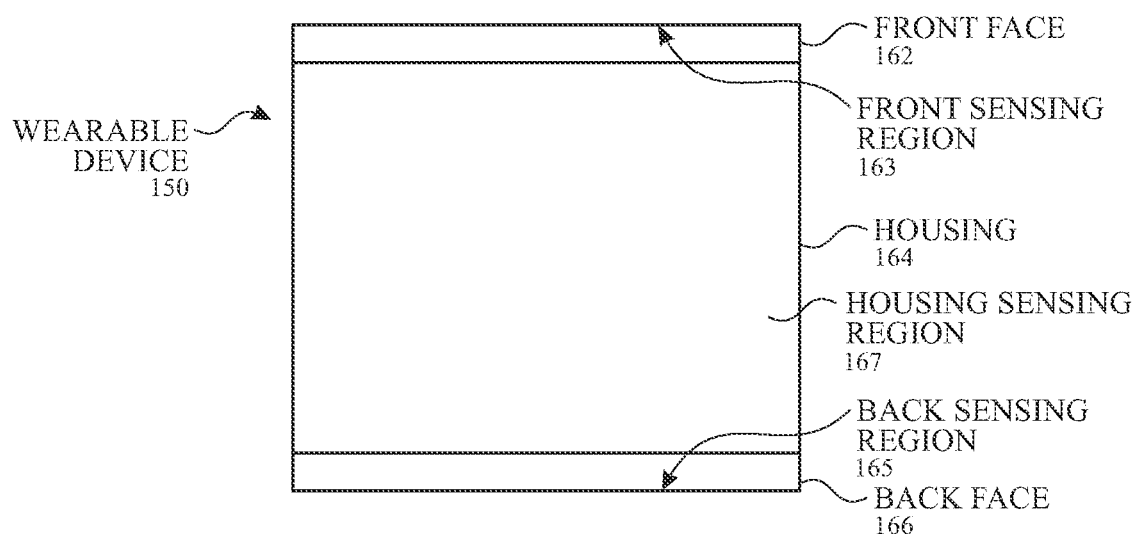
FIG. 1F illustrates a cross-sectional view of some components of the electronic device of FIG. 1E.

FIG. 1F illustrates a side view of the wearable device 150 of FIG. 1E. The wearable device 150 includes a front face 162, a housing 164, and a back face 166. The front face 162 is sometimes referred to herein as "front crystal" of the wearable device 150 and the back face 166 is sometimes referred to herein as "back crystal" of the wearable device 150. The front face 162 and the back face 166 generally refer to a substrate such as glass, plastic, or crystal. For example, the front face 162 and the back face 166 (also referred to as a rear face) can protect internal components of the wearable device 150, but also allow for optical transmission from a display screen (e.g., touch screen 152 near the front face 162) and/or optical sensors (e.g., near the back face 166) of the wearable device 150

Furthermore, in FIG. 1F, the wearable device 150 includes a front sensing region 163, a back sensing region 165, and housing sensing region 167. In some examples, the temperature sensing system measures temperatures at a location corresponding to the front sensing region 163 inside the wearable device 150. For example, the temperature sensing system optionally includes temperature sensors proximate to or in the front sensing region 163 that are configured to measure temperatures proximate to or in the front sensing region 163 (e.g., temperatures outside or inside of the wearable device 150). In some examples, the temperature sensing system may measure temperatures at a location corresponding to the back sensing region 165 inside the wearable device 150. For example, the temperature system optionally includes temperature sensors proximate to or in the back sensing region 165 that are configured to measure temperatures proximate to or in the back sensing region 165 (e.g., temperatures outside or inside of the wearable device 150). For example, the temperature sensors proximate to or in the back sensing region 165 may measure temperatures associated with an optical system located at the back face 166. Alternatively, or additionally, in some examples, the temperature sensing system can be used to estimate the temperature outside of the wearable device 150, such as the temperature of air contacting the back face 166, or the temperature of other objects at least partially in contact with, or overlapping, the back face 166 (e.g., skin temperature at the wrist). In some examples, the temperature sensing system measures temperatures at a location corresponding to the housing sensing region 167. For example, the temperature sensing system optionally includes temperature sensors proximate to or in the housing sensing region 167 that are configured to measure temperatures proximate to or in the housing sensing region 167 (e.g., temperatures outside or inside of the wearable device 150).

It should be noted that the temperature sensing system can be used to estimate the temperature at a location within the wearable device 150, as well as the temperature of objects outside the wearable device 150 (e.g., the air surrounding wearable device 160, or objects at least partially in contact with the front face 162, the back face 166, or the housing 164).

Figure 1G:
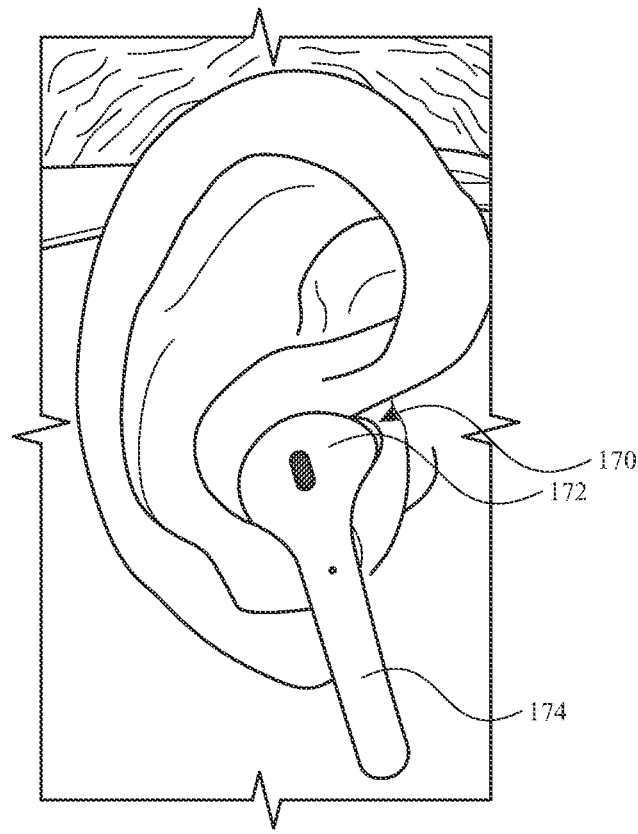
FIG. 1G illustrates an electronic device with a temperature sensing system that utilizes the internal heat-generating component noise correction technique, in accordance with some examples of the present disclosure.

FIG. 1G illustrates in-ear headphones 170 (e.g., another example electronic device) that includes an earbud 172 and a protrusion 174. The in-ear headphones 170 includes a temperature sensing system that utilizes the internal heat-generating component noise correction technique, according to some examples of the present disclosure. In some examples, the temperature sensing system within in-ear headphones 170 is used to measure temperatures of components within in-ear headphones 170, such as temperatures associated with circuitry within the earbud 172 or the protrusion 174. Alternatively, or additionally, the temperature sensing system can be used to estimate the temperature outside of in-ear headphones 170, such as the temperature of air contacting earbud 172, or protrusion 174, and the temperature of other objects at least partially in contact with, or overlapping, earbud 172, or protrusion 174 (e.g., ear/body temperature).

It should be understood that the electronic devices illustrated in FIGS. 1A-1G are provided by way of example, and other types of electronic devices may include a temperature sensing system for detecting temperatures within or outside the devices and may utilize the internal heat-generating component noise correction technique. For example, the electronic devices can include devices worn on or placed into contact with the face, the head, or the fingers of a user (or at another location on a user's body). The electronic devices can include over-ear headphones, glasses, head bands, chest straps, wrist straps, rings, etc. For example, glasses worn on a user's face can include a temperature system to estimate skin temperature at a user's temples, forehead or nose, among other possibilities. In some examples, the glasses include one or more temperature sensors at or near locations of interest for temperature measurement (e.g., one can be used to estimate the temperature at a left temple and a second can be used to estimate temperature at a right temple). In a similar manner, a head band, chest strap or ring can include one or more temperature sensors to measure skin temperature at a location of contact with the user's body. In some examples, the temperature sensing system may be used in a thermostat device (e.g., a wall mounted thermostat) or can be incorporated into a device to add a thermostat capability (e.g., incorporating the temperature sensing system in a computer, tablet, media player, smart phone, smart speaker, etc.). Additionally, in some examples, less or more components of the electronic devices illustrated in FIGS. 1A-1G are included in an electronic device that includes a temperature sensing system that utilizes the internal heat-generating component noise correction technique.

In some examples, the internal heat-generating component noise correction technique may be used alongside use of temperature sensors to enable more accurate temperature estimates. In some examples, the use of one or more thermopiles and temperature sensor(s), in addition to the internal heat-generating component noise correction technique, may reduce the impact of heat-generating components (also referred to herein as "internal heat-generating components") within the electronic device, and also reduce the overall drift or other error in a temperature estimate (e.g., process, voltage, and/or temperature variations in the temperature sensors, influence from thermal aggressors, etc.).

In some examples, the temperature sensing systems estimate external temperature continuously during the operation of the electronic device. For example, a system including the temperature sensing system utilizing the internal heat-generating component noise correction technique described herein can be used to measure a user's body temperature and/or track a user's body temperature when authorized to do so by a user. For example, wearable electronic devices in proximity with a user's body throughout a day or night can provide for seamlessly measuring body temperature. In some examples, the type of body temperature estimate may be changed depending on use conditions, such as time of day or user physiological characteristics. For example, when a user is vasoconstricted (e.g., limbs and extremities receive less blood flow), a temperature measurement of a user's skin at the wrist using a wrist-worn electronic device may not accurately reflect the user's core body temperature. In some examples, wearable electronic devices are worn on a user's wrist (or other limbs or extremities), can be used to estimate physiological temperature values at night, when a user can be less likely to be vasoconstricted. Other wearable electronic devices that can be worn around the chest, on the head, over the eyes, or even positioned within an opening of the body, can be used to estimate physiological temperature values at any time. In some examples, a back face of a wearable electronic device (e.g., the wearable device 150 of FIGS. 1E, 1F) can be used to estimate body temperature (e.g., by estimating wrist temperature) when the user can be in a vasodilation condition (e.g., such as at night when a user sleeps), but a user can measure temperature at a region of the body different at or closer to core body temperature using a front face of the electronic device to enable measurements even during vasoconstriction. For example, a user may bring the front face of a wearable device into contact with the forehead to measure core body temperature.

Figure 2:
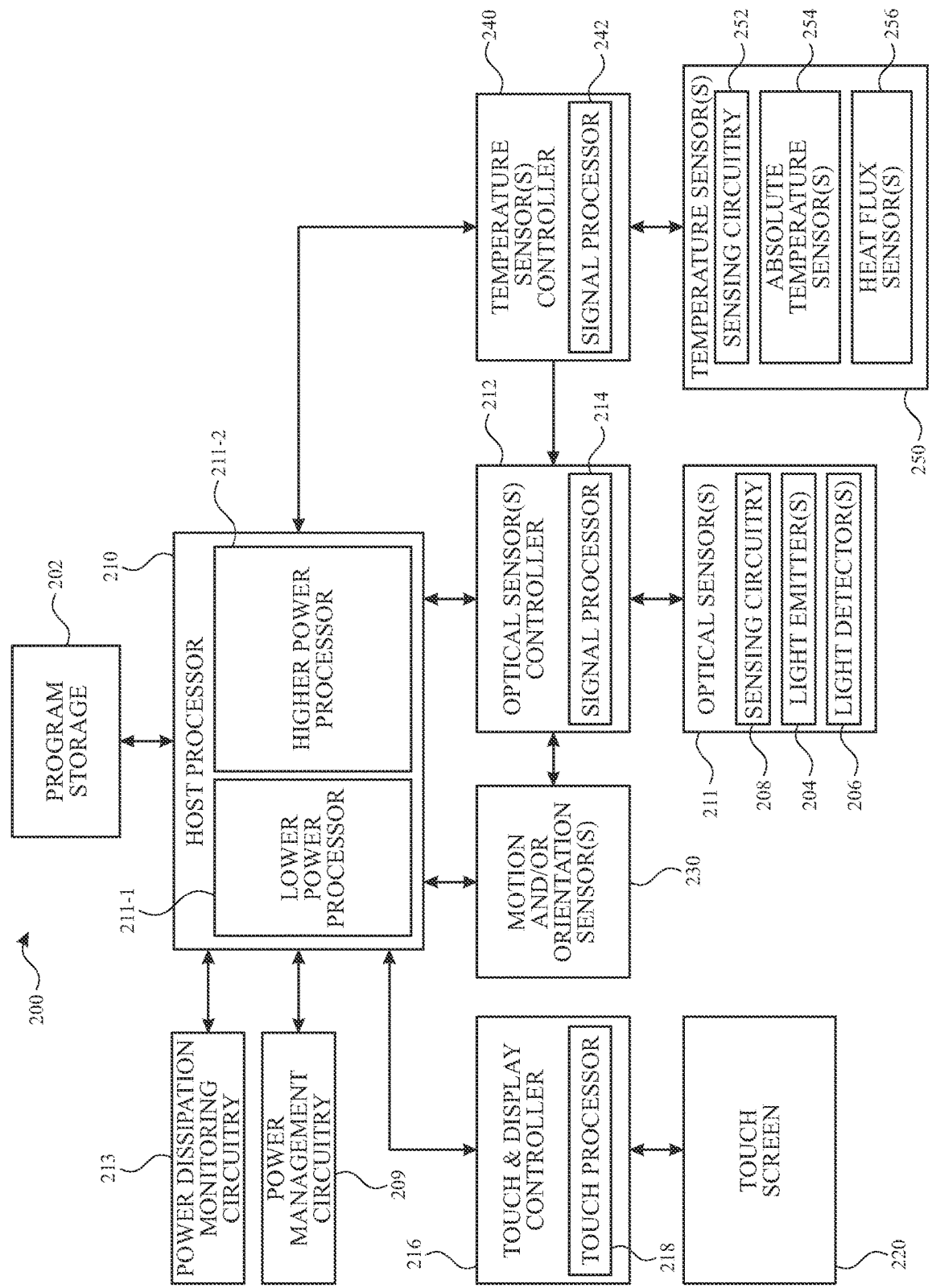
FIG. 2 illustrates a block diagram of an electronic device that includes a temperature sensing system that utilizes the internal heat-generating component noise correction technique for estimating measurements acquired by the temperature sensing system, in accordance with some examples of the present disclosure.

FIG. 2 illustrates a block diagram of an electronic device that includes a temperature sensing system that utilizes the internal heat-generating component noise correction technique for estimating measurements acquired by the temperature sensing system, in accordance with some examples of the present disclosure. Computing system 200 can correspond to mobile telephone 136, media player 140, personal computer 144, tablet computer 148, wearable device 150, or in-ear headphones 170 illustrated in FIGS. 1A-1G (or may be implemented in other wearable or non-wearable electronic devices). In some examples, one or more components of the computing system 200 are utilized in performance of the internal heat-generating component noise correction technique.

Computing system 200 includes a host processor 210 (or more than one processor) programmed to (configured to)

execute instructions and to carry out operations associated with computing system 200. For example, using instructions retrieved from a program storage 202, host processor 210 can control the reception and manipulation of input and output data between components of computing system 200. Host processor 210 can be a single-chip processor (e.g., an application specific integrated circuit) or can be implemented with multiple components/circuits. For example, FIG. 2 illustrates the host processor 210 including a relatively lower power processor 211-1 and a relatively higher power processor 211-2, as described in more detail herein.

In some examples, host processor 210, together with an operating system can operate to execute computer code, and produce and/or use data. The computer code and data can reside within a program storage 202 that can be operatively coupled to host processor 210. Program storage 202 can generally provide a place to hold data used by computing system 200. Program storage 202 can be any non-transitory computer-readable storage medium. By way of example, program storage 202 can include Read-Only Memory (ROM), Random-Access Memory (RAM), hard disk drive and/or the like. The computer code and data could also reside on a removable storage medium and loaded or installed onto computing system 200 when needed. Removable storage mediums include, for example, CD-ROM, DVD-ROM, Universal Serial Bus (USB), Secure Digital (SD), Compact Flash (CF), Memory Stick, Multi-Media Card (MMC) and/or a network component.

As described herein, in some examples, host processor 210 can represent multiple processors, such as lower power processor 211-1 and higher power processor 211-2. Lower power processor 211-1 and higher power processor 211-2 can represent separate processing chips, each with independent timing and power requirements. For example, lower power processor 211-1 can operate using a first clock signal and at a first power level that allows processor 211-1 to remain operational ("on") across most or all operating modes of computing system 200 (e.g., a sleep mode, awake mode, idle mode, etc.). By contrast, higher power processor 211-2 can operate using a second clock signal (e.g., a higher frequency clock), different from the first, or at a second power level, higher than the first. Because of the higher power requirements of higher power processor 211-2, host processor 210 (e.g., an operating system on host processor 210) can selectively disable, or power down higher power processor 211-2 or otherwise throttle its power consumption during certain operating modes of computing system 200 (e.g., a power saving mode, sleep mode, etc.). In some examples, as described herein, the higher power processor 211-1 can be powered down or otherwise throttle its power consumption to enable temperature measurements without error introduced by the power dissipation by higher power processor 211-1.

Lower power processor 211-1 and/or higher power processor can interface with various sensors of computing system 200 including a touch sensor panel and/or a touch screen 220 (via touch and display controller 216), motion and/or orientation sensor(s) 230, optical sensor(s) 211 (via optical sensor controller 212), and temperature sensor(s) 250 (via temperature sensor(s) controller 240). In some examples, lower power processor 211-1 can operate in a sleep mode or a power-saving mode, while higher power processor 211-2 is powered down. In some examples, lower power processor 211-1 can change an operating mode of computing system 200 or otherwise cause higher power processor 211-2 to be powered on (e.g., when wake up conditions are detected).

Computing system 200 can also include power management circuitry 209 and/or power dissipation monitoring circuitry 213. Host processor 210 (e.g., lower power processor 211-1 and/or higher power processor 211-2) can be coupled to power management circuitry 209 and/or power dissipation monitoring circuitry 213. Power management circuitry 209 can regulate power delivery from power supply circuitry (e.g., a battery, or another power source of computing system 200) to various components of computing system 200 (e.g., sensors, processors, antennas, displays, etc.). As an example, power management circuitry 209 can interrupt or throttle power delivery to components that generate heat within computing system 200 (e.g., heat-generating components, thermal aggressors), especially during temperature measurements that may be sensitive to heat from such components. Power management circuitry 209 can monitor temperatures inside a housing of computing system 200 and/or temperatures outside the housing (e.g., environmental temperatures, user skin/core temperature). As an example, power management circuitry 209 can monitor these temperatures to detect unsafe operating conditions for computing system 200, and can selectively interrupt or throttle power delivery to certain heat-generating components to bring computing system 200 into a safe operating condition. In some examples, power management circuitry 209 provides control signals to inline switches coupled between the power supply circuitry of computing system 200 and various components of computing system 200, where the control signals determine an amount of current or power that can be delivered to the respective components. As an example, power management circuitry 209 can provide a first control signal to a switch interposed between a battery power source of computing system 200 and touch screen 220, such that the first control signal limits the amount of power or current delivered to the touch screen by the battery power source. As another example, power management circuitry 209 can provide a second control signal to a switch interposed between a battery power source of computing system 200 and antenna circuitry (not shown) of the system, such that the second control signal interrupts power delivery or current flow between the battery power source and the antenna circuitry.

Power dissipation monitoring circuitry 213 can monitor power supply circuitry of computing system 200, and can regulate power delivery from the power supply circuitry (not shown) to various components of computing system 200 (e.g., by sending instructions to power management circuitry 209). In some examples, power dissipation monitoring circuitry 213 includes a sensor coupled to the power supply circuitry (e.g., battery) of computing system 200. The sensor can measure power drawn by components of computing system 200 from the power supply circuitry (e.g., a battery of computing system 200). In some examples, the power drawing by components of the computing system 200 can be estimated based on a current draw from the power supply circuitry. In some examples, the power drawn can be estimated on a device basis (e.g., estimated current draw from the battery). In some examples, the power drawn can be estimated on a per-component basis for some (e.g., known heat-generating components or heat-generating components that dissipate more than a threshold amount of heat) or all of the components. In some examples, the power dissipation monitoring circuitry 213 includes at least one resistor (e.g., with a resistance greater than 10 M Ohm or 20 M Ohm) coupled between with the power supply circuitry or battery of computing system 200 and components of computing system 200 that draw power. A current through the resistor can be measured by determining a voltage across the resistor (e.g., periodically or in response to a trigger) and converting the voltage to a resistance (e.g., using Ohms law).

In some examples, computing system 200 (e.g., host processor 210, power management circuitry 209, and/or power dissipation monitoring circuitry 213) can include power dissipation models that relate current/power draw from the power supply or battery of computing system 200 and temperature or heat dissipation within the device. Additionally or alternatively, computing system 200 can include models for estimating the power consumption and/or resulted temperature changes by different components, in different operational modes of computing system 200 (e.g., power consumption by touch screen 220 in an idle mode, in a low-brightness mode, in a high-brightness mode, etc.). Impacts of the power consumption of certain components, or heat-generating components of computing system 200, can be determined using lab characterizations of the components (e.g., an impulse response, a rise time, a fall time, and amplitude measured for each thermal aggressor at various respective power levels). Accordingly, computing system 200 can dynamically model temperatures within the computing system 200, based on power dissipation models, and one or more current/power draw measurement at the system's power supply circuitry or battery. In some examples, power management circuitry 209 can limit or interrupt the delivery of power to certain components, such as during a measurement interval associated with temperature sensor(s) 250 (e.g., an interval where sensor data is collected from temperature sensors 250), based on information from power dissipation monitoring circuitry 213. As an example, when a power dissipation model indicated that an amount of power being drawn by components of computing system 200 corresponds to a temperature within the device outside of a range required for accurate and/or reliable operation of temperature sensor(s) 250, power management circuitry 209 to limit or interrupt power to components of computing system 200 such that the total power drawn by the components can be reduced to a level corresponding to a temperature within the range required for accurate and/or reliable operation of temperature sensor(s) 250. In some examples, power dissipation monitoring circuitry 213 and/or power management circuitry 209 can cause host processor 210 to delay the performance of certain functions or operations to limit or interrupt power to components of computing system 200. As an example, host processor 210 can postpone operations (or modify operations for reduced power consumption) involving touch screen 220, GPS circuitry (not shown), wireless communication chips (not shown), antennas (not shown), LEDs, or other components of computing system 200 that may be heat-generating components, until after a measurement interval associated with temperature sensor(s) 250 (e.g., an interval during which one or more of the components receives less power). In some examples, the host processor 210 may not postpone operations because the internal heat-generating component noise correction technique accounts for an aggressor noise signal that may result from a superposition of aggressor noises, as will be described herein.

Additionally or alternatively, characterizations of the components (e.g., a rise time, a fall time, and amplitude measured for each thermal aggressor at various respective power levels) can be used for temperature compensation. For example, host processor 210 can use temperature compensation models to adjust temperature sensor measurements or temperature sensor data according to the temperature within the computing system 200 or the temperature contribution of internal heat-generating components. As an example, the amount of power draw (or current draw) by components of computing system 200 can be measured by power dissipation monitoring circuitry 213. The measured power draw can be used to correct for heat from internal heat-generating components within the computing system 200. In some examples, the compensation can be applied when the power draw corresponds to a temperature change outside of a range required for accurate and/or reliable operation of the temperature sensor(s) 250. Accordingly, a temperature compensation model (e.g., the temperature change corresponding to the amount of power drawn by the components) can be used (e.g., by temperature sensor(s) controller 240) to adjust temperature sensor data from temperature sensor(s) 250 to account for the elevated temperature within the electronic device caused by internal heat-generating components.

In some examples, computing system 200 includes one or more input/output (I/O) controllers that can be operatively coupled to host processor 210. I/O controllers can be configured to control interactions with one or more I/O devices (e.g., touch sensor panels, display screens, touch screens, physical buttons, dials, slider switches, joysticks, or keyboards). I/O controllers can operate by exchanging data between host processor 210 and the I/O devices that desire to communicate with host processor 210. The I/O devices and I/O controller can communicate through a data link. The data link can be a unidirectional or bidirectional link. In some cases, I/O devices can be connected to I/O controllers through wireless connections. A data link can, for example, correspond any wired or wireless connection including, but not limited to, PS/2, Universal Serial Bus (USB), Firewire, Thunderbolt, Wireless Direct, IR, RF, Wi-Fi, BLUETOOTH, or the like.

In the illustrated example, computing system 200 includes a temperature sensor(s) controller 240 operatively coupled to host processor 210 and to temperature sensor(s) 250 (e.g., one or more temperature sensors). Also, the temperature sensor controller 240 is coupled to optical sensor controller 212. The temperature sensor(s) 250 include one or more absolute temperature sensor(s) 254, one or more heat flux sensor(s) 256, and sensing circuitry 252 (e.g., analog and/or digital circuitry to measure signals at the sensors 254/256, provide processing (e.g., amplification, filtering, level-shifting), and convert analog signals to digital signals for performing temperature and/or heat-flux sensing measurements. As an example, the one or more absolute temperature sensor(s) 254 and one or more heat flux sensor(s) 256 may be configured to measure temperature at various locations within the computing system 200, including at least one location or region inside the wearable device different than a location or region in which an absolute temperature sensor is disposed for the computing system 200. These temperatures and/or heat flux measurements can be used to measure temperature characteristics of the device under various modes of operation (e.g., to estimate when temperatures within a device are approaching unsafe or unsustainable levels), to estimate ambient temperatures outside the device, or to estimate a physiological signal associated with a user (e.g., a body temperature of the user). In some examples, the temperatures sensor(s) 250 include one or more absolute temperature sensor(s) 254 without including one or more heat flux sensor(s) 256. In some examples, the temperature sensor(s) 250 include one or more heat flux sensor(s) 256, without including one or more absolute temperatures sensor(s) 254.

Measured raw data from the absolute temperature sensors 254, heat flux sensor(s) 256, and sensing circuitry 252 can be transferred to the host processor 210 (via temperature sensor(s) controller 240), and the host processor 210 can perform the signal processing described herein to estimate internal or external temperatures and/or to estimate physiological signals (e.g., body temperature associated with the user). Host processor 210 and/or temperature sensor controller 240 can operate temperature sensor(s) 250 to measure temperature values associated with computing system 200, and to estimate temperature values associated with the environment external to the system. Also, in some examples, the host processor 210 and/or temperature sensor controller 240 may perform the internal heat-generating component noise correction technique disclosed herein. In some examples, temperature sensor(s) controller 240 can include signal processor 242 to sample, filter, and/or convert (from analog to digital) signals generated by various temperature sensor(s) 250, which can be positioned at different locations within a housing for the computing system 200. In some examples, signal processor 242 is a digital signal processing circuit such as a digital signal processor (DSP). In some examples, the analog data measured by the temperature sensor(s) 250 can be converted into digital data by an analog to digital converter (ADC). In some examples, the digital data from the temperature sensors can be stored for processing in a buffer (e.g., a first-in-first-out (FIFO) buffer) or other volatile or non-volatile memory (not shown) in temperature sensor(s) controller 240. In some examples, data from the temperature sensors are used as inputs to a heat model for the example electronic device, and used to estimate temperatures external to the housing of computing system 200 (e.g., temperature of an object or user that contacts a portion of the device or an ambient temperature). In some examples, host processor 210 and/or temperature sensor(s) controller 240 can store the raw data and/or processed information in memory (e.g., ROM or RAM) for historical tracking or for future diagnostic purposes.

In some examples, the temperature sensor(s) 250 can include a negative temperature coefficient (NTC) temperature sensor, a resistance temperature detector (RTD), or a diode based temperature sensor.

In the illustrated example, computing system 200 includes an optical sensor(s) controller 212 operatively coupled to host processor 210 and to one or more optical sensors 211. As illustrated, in some examples, the optical sensor(s) 211 include light emitter(s) 204, light detector(s) 206, and sensing circuitry 208 (e.g., analog circuitry to drive emitters and measure signals at the detector, provide processing (e.g., amplification, filtering), and convert analog signals to digital signals). As an example, light emitters 204 and light detectors 206 can be configured to generate and emit light into a user's skin and detect returning light (e.g., reflected and/or scattered) to measure a physiological signal (e.g., a photoplethysmogram, or PPG signal), respectively. The absorption and/or return of light at different wavelengths can also be used to determine a characteristic of the user (e.g., oxygen saturation, heart rate) and/or about the contact condition between the light emitter(s) 204/light detector(s) 206 and the user's skin. Measured raw data from the light emitter(s) 204, light detector(s) 206, and sensing circuitry 208 can be transferred to host processor 210, and host processor 210 can perform the signal processing described herein to estimate a characteristic (e.g., oxygen saturation, heart rate, etc.) of the user of the example electronic device from the physiological signals. Host processor 210 and/or optical sensor(s) controller 212 can operate light emitter(s) 204, light detector(s) 206 and/or sensing circuitry 208 to measure data from the optical sensor. In some examples, optical sensor controller(s) 212 can include timing generation for light emitters 204, light detectors 206 and/or signal processor 214 to sample, filter and/or convert (from analog to digital) signals measured from light at different wavelengths. Optical sensor(s) controller 212 can process the data in signal processor 214 and report outputs (e.g., PPG signal, relative modulation ratio, perfusion index, heart rate, on-wrist/off-wrist state, etc.) to the host processor 210. Signal processor 214 can be a digital signal processing circuit such as a digital signal processor (DSP). The analog data measured by the optical sensor(s) 211 can be converted into digital data by an analog to digital converter (ADC), and the digital data from the physiological signals can be stored for processing in a buffer (e.g., a FIFO) or other volatile or non-volatile memory (not shown) in optical sensor(s) controller 212. In some examples, some light emitters and/or light detectors can be activated, while other light emitters and/or light detectors can be deactivated (by power management circuitry 209) to conserve power, for example, or for time-multiplexing (e.g., to avoid interference between channels). In some examples, host processor 210 and/or optical sensor(s) controller 212 can store the raw data and/or processed information in memory (e.g., ROM or RAM) for historical tracking or for future diagnostic purposes.

In some examples, some light emitters and/or light detectors have operation characteristics that vary based on the temperature of the light emitters and/or light detectors. As an example, some light emitters may output light at a wavelength that varies based on the temperature of the light emitter. In some examples, optical sensor(s) controller 212 and/or host processor 210 (higher power processor 211-2 and/or lower power processor 211-1) can receive temperature information associated with the light emitter (e.g., from temperature sensor(s) controller 240), and adjust the wavelength of the optical sensor and/or processing of signals associated with the light emitter and/or a corresponding light detector based on the received temperature information. For example, an estimation of a physiological characteristic (e.g., oxygen saturation, heart rate) may be sensitive to wavelengths of light used to measure optical signals. In some examples, the optical sensor(s) controller 212 and/or host processor 210 can use the received temperature information to estimate a wavelength of light generated by the optical sensor and compensate the estimation of the physiological characteristic based on the estimated wavelength of light.

In the illustrated example, computing system 200 includes one or more motion and/or orientation sensor(s) 230. The one or more motion and/or orientation sensor(s) 230 optionally includes an accelerometer (e.g., a multi-channel accelerometer (e.g., a 3-axis accelerometer), a gyroscope, and/or an inertia-measurement unit (IMU).

In the illustrated example, computing system 200 includes a touch and display controller 216 operatively coupled to host processor 210 and to touch screen 220. Touch screen 220 can be configured to display visual output in a graphical user interface (GUI), for example. The visual output can include text, graphics, video, and any combination thereof. In some examples, the visual output can include a text or graphical representation of the physiological signal (e.g., a PPG waveform) or a characteristic of the physiological signal (e.g., oxygen saturation, heart rate, temperature, etc.) Touch screen can be any type of display including a liquid crystal display (LCD), a light emitting polymer display (LPD), an electroluminescent display (ELD), a field emission display (FED), a light emitting diode (LED) display, an organic light emitting diode (OLED) display, or the like. Host processor 210 can send raw display data to touch and display controller 216, and touch and display controller 216 can send signals to touch screen 220. Data can include voltage levels for a plurality of display pixels in touch screen 220 to project an image. In some examples, host processor 210 can be configured to process the raw data and send the signals to touch screen 220 directly. Touch and display controller 216 can also detect and track touches or near touches (and any movement or release of the touch) on touch screen 220. For example, touch processor 218 can process data representative of touch or near touches on touch screen 220 (e.g., location and magnitude) and identify touch or proximity gestures (e.g., tap, double tap, swipe, pinch, reverse-pinch, etc.). Host processor 210 can convert the detected touch input/gestures into interaction with graphical objects, such as one or more user-interface objects, displayed on touch screen 220 or perform other functions (e.g., to initiate a wake of the device or power on one or more components).

In some examples, touch and display controller 216 can be configured to send raw touch data to host processor 210, and host processor 210 can process the raw touch data. In some examples, touch and display controller 216 can process raw touch data via touch processor 218. The processed touch data (touch input) can be transferred from touch processor 218 to host processor 210 to perform the function corresponding to the touch input. In some examples, a separate touch sensor panel and display screen can be used, rather than a touch screen, with corresponding touch controller and display controller.

In some examples, the touch sensing of touch screen 220 can be provided by capacitive touch sensing circuitry (e.g., based on mutual capacitance and/or self-capacitance). For example, touch screen 220 can include touch electrodes arranged as a matrix of small, individual plates of conductive material or as drive lines and sense lines, or in another pattern. The electrodes can be formed from a transparent conductive medium such as Indium Tin Oxide (ITO) or Antimony Tin Oxide (ATO), although other partially or fully transparent and non-transparent materials (e.g., copper) can also be used. In some examples, the electrodes can be formed from other materials including conductive polymers, metal mesh, graphene, nanowires (e.g., silver nanowires) or nanotubes (e.g., carbon nanotubes). The electrodes can be configurable for mutual capacitance or self-capacitance sensing or a combination of mutual and self-capacitance sensing. For example, in one mode of operation, electrodes can be configured to sense mutual capacitance between electrodes; in a different mode of operation, electrodes can be configured to sense self-capacitance of electrodes. During self-capacitance operation, a touch electrode can be stimulated with an AC waveform, and the self-capacitance to ground of the touch electrode can be measured. As an object approaches the touch electrode, the self-capacitance to ground of the touch electrode can change (e.g., increase). This change in the self-capacitance of the touch electrode can be detected and measured by the touch sensing system to determine the positions of one or more objects when they touch, or come in proximity to without touching, the touch screen. During mutual capacitance operation, a first touch electrode can be stimulated with an AC waveform, and the mutual capacitance between the first touch electrode and a second touch electrode can be measured. As an object approaches the overlapping or adjacent region of the first and second touch electrodes, the mutual capacitance therebetween can change (e.g., decrease). This change in the mutual capacitance can be detected and measured by the touch sensing system to determine the positions of one or more objects when they touch, or come in proximity to without touching, the touch screen. In some examples, some of the electrodes can be configured to sense mutual capacitance therebetween and some of the electrodes can be configured to sense self-capacitance thereof.

It should be noted that one or more of the functions described herein, including estimating a temperature internal or external to an electronic device and performing the internal heat-generating component noise correction technique according to examples of this present disclosure, can be performed by firmware stored in memory (or in program storage 202) and executed by temperature sensor(s) controller 240, optical sensor(s) controller 212, touch and display controller 216 or host processor 210. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this disclosure, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3:
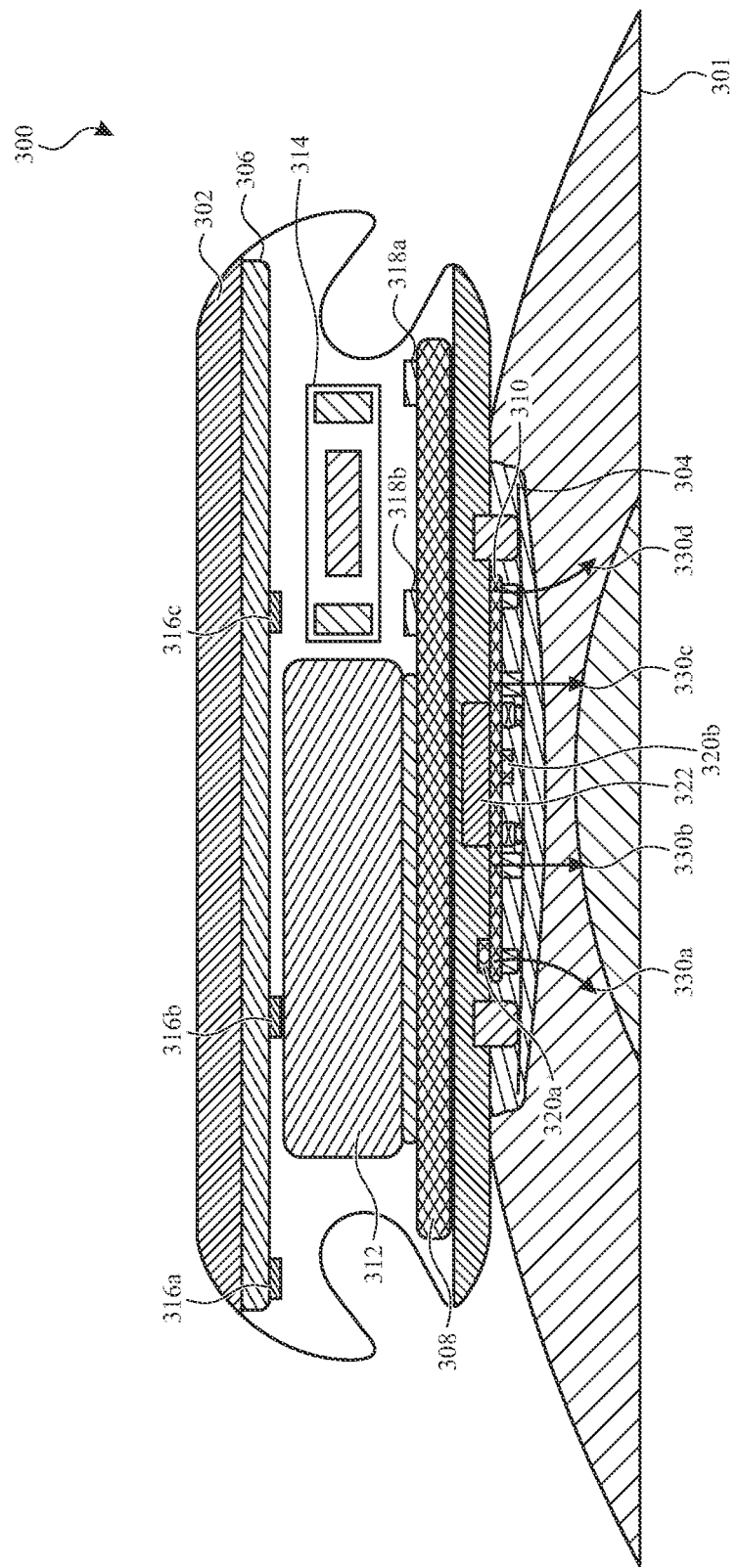
FIG. 3 illustrates a cross-sectional side view of an electronic device including printed circuit boards (PCBs) arranged on different layers of the electronic device and temperature sensing circuitry of a temperature sensing system that utilizes the internal heat-generating component noise correction technique, in accordance with some examples of the present disclosure.

FIG. 3 illustrates a cross-sectional side view of an electronic device 300 including printed circuit boards arranged on different layers of the electronic device and temperature sensing circuitry of a temperature sensing system that utilizes the internal heat-generating component noise correction technique, in accordance with some examples of the present disclosure.

Electronic device 300 optionally corresponds to a wearable device 150 of FIGS. 1E, 1F (or more generally optionally corresponds to any of the electronic devices illustrated by FIGS. 1A-1G). Electronic device 300 optionally corresponds to a watch, a fitness tracker, or any other device (e.g., optionally used to measure physiological signals associated with a user). In some examples, electronic device 300 can be secured to a user 301 (e.g., exposed skin on the user's body). Electronic device 300 can be attached to user around the wrist, head, over the eyes, or on any exposed surface of the body that is suitable for measuring physiological signals associated with the user.

In the illustrated example, the electronic device 300 includes a front crystal 302 and a back crystal 304. The electronic device 300 also includes a first printed circuit board 306 at a first layer proximate to the front crystal 302. In some examples, first printed circuit board 306 may be used to implement a touch sensor panel, a display, or a touch screen disposed below the front crystal 302, such as the touch and display controller 216 of FIG. 2, the touch screen 220 of FIG. 2, and/or the capacitive touch sensing circuitry of the touch screen 220 of FIG. 2. Such implementations optionally involve the operations and components discussed earlier in the present disclosure with regards to a touch sensor panel (e.g., self-capacitance sensing, mutual capacitance sensing, an LED display). The first printed circuit board 306 is optionally coupled to one or more heat-generating components. In some examples, the first printed circuit board 306 dissipates heat itself. In the illustrated example, the first printed circuit board 306 is coupled to temperature sensing circuitry of temperature sensors 316A, 316B, 316C. The temperature sensors 316A-C are optionally used to measure a temperature (e.g., an amount of thermal energy, an average amount of kinetic energy of particles) present at their respective locations in the electronic device 300. The temperature measurement may be impacted by heat generated by components of the electronic device 300 including components of the printed circuit board 306. In some examples, the temperature sensors 316A-C are used by a temperature sensing system to estimate temperatures outside of the electronic device 300 (e.g., an ambient temperature).

Operations of the electronic device 300 involving components of the first printed circuit board 306 may cause heat to be generated in the electronic device 300 due to heat dissipation from components of the first printed circuit board 306. For example, in response to a receiving a display operation, processors of the first printed circuit board 306 may begin executing the instructions of the display operation to cause display of an interface on a display component of the electronic device 300. As the processors and display components are executing the instructions, the processors and display components may dissipate some energy as heat.

In the illustrated example, the electronic device 300 includes a second printed circuit board 308 at a second layer within the electronic device 300. The second printed circuit board 308 is coupled (e.g., electrically coupled) to a System-in-Package (SiP 312) component (e.g., a first heat-generating component, centralized processing circuitry) of the electronic device 300. The SiP 312 optionally includes integrated circuits that are utilized in various operations of the electronic device 300. In some examples, the SiP 312 includes components of the computing system 200 such as the host processor 210, power management circuitry 209, power dissipation monitoring circuitry 213. In addition, in some examples, the SiP 312 includes a graphical processing unit (GPU) and wireless communication circuitry, optionally in addition to other components. These integrated circuits may draw current and generate heat in response to the drawing of current. As the SiP 312 is used, the SiP 312 dissipates thermal energy. For example, some of the power (e.g., a proportion of power) that is consumed by the SiP 312 is dissipated as heat. The heat generated by the SiP 312 optionally causes the electronic device 300 to increase a temperature inside of the electronic device 300.

In the illustrated example, the second printed circuit board 308 is coupled to temperature sensing circuitry of temperature sensors 318a, 318b. These temperature sensors are optionally configured to measure a temperature inside of the electronic device 300 at their respective locations. Specifically, these temperature sensors are optionally proximate to internal components of the electronic device 300, and are configured to measure temperatures proximate to the internal components. As the second printed circuit board 308 is operated, heat is optionally dissipated by the second printed circuit board 308 (e.g., by components of the second printed circuit board 308. Component 314 represents one or more additional component(s) of the electronic device, such as a system-on-chip (SoC), a power management unit (PMU), a battery, and/or a haptic engine that may draw current and/or act as heat-generating component(s) during operations of the electronic device.

In the illustrated example, the electronic device 300 includes a third printed circuit board 310. The third printed circuit board 310 is coupled to temperature sensors 320a, 320b. The third printed circuit board 310 optionally includes an optical sensor controller 322 (e.g., the optical sensor controller 212 of FIG. 2) and optical sensors (e.g., the optical sensors 211 of FIG. 2) configured to emit light and detect light through back crystal 304 (e.g., light emitters and detectors mounted on the opposite side of third printed circuit board 310). In some examples, heat is dissipated by one or more heat-generating components proximate to or on the third printed circuit board 310, such as the optical sensor controller 322. The temperature sensors 320a, 320b are optionally configured to measure a temperature inside of the electronic device 300 at their respective locations in the electronic device 300. In addition, the same temperature sensors 320a, 320b, or one or more additional temperature sensors (optionally coupled to the third printed circuit board 310) may be used by a temperature sensing system to estimate a temperature external to the electronic device 300, such as a temperature of the user 301.

In some examples, the electronic device 300 includes more or fewer printed circuit boards arranged on similar or different layers as the first layer, the second layer, and the third layer. In addition, it should be noted that the number of printed circuit boards, placement of printed circuit boards, and distribution of components between the printed circuit boards shown in FIG. 3 is representative and non-limiting. In some examples of an electronic device 300, fewer or more printed circuit boards are present, fewer temperature sensors are present, or the components of computing system 200 can be distributed differently across the one or more printed circuit boards. Further, in some examples, one or more of the first printed circuit board 306, the second printed circuit board 308, and the third printed circuit board 310 includes a host processor (e.g. the host processor 210 of FIG. 2), program storage (e.g., the program storage 202 of FIG. 2), a touch and display controller (e.g., the touch and display controller 216 of FIG. 2), optical sensor controller (e.g., the optical sensor(s) controller 212 of FIG. 2), or temperature sensor controller (e.g., the temperature sensor(s) controller 240 of FIG. 2).

In the illustrated example, representative heat paths 330a-d, which may include heat dissipating from heat-generating components (e.g., LEDs), may affect temperature measurements acquired by temperature sensors of the electronic device 300. These effects on the temperature measurements cause an error in estimate of an external temperature (e.g., a temperature measurement of the user 301 or an ambient temperature), which is computed based on the temperature measurements. The representative heat paths 330a, 330b, 330c, and 330d proceed through locations of high thermal conduction. In some examples, more or fewer heat paths are present. The illustrated example of representative heat paths is for illustration purposes and is non-limiting.

It should also be noted that the number, placement, and distribution of temperature sensors shown in the electronic device 300 (e.g., temperature sensors 316a-c, 320a, 320b) is representative and non-limiting. In some examples, the electronic device 300 includes more or fewer temperature sensors than illustrated in FIG. 3. In some examples, the electronic device 300 includes one temperature sensor or two temperature sensors. In some examples, the electronic device 300 includes one temperature sensor and one thermopile.

Figure 4:
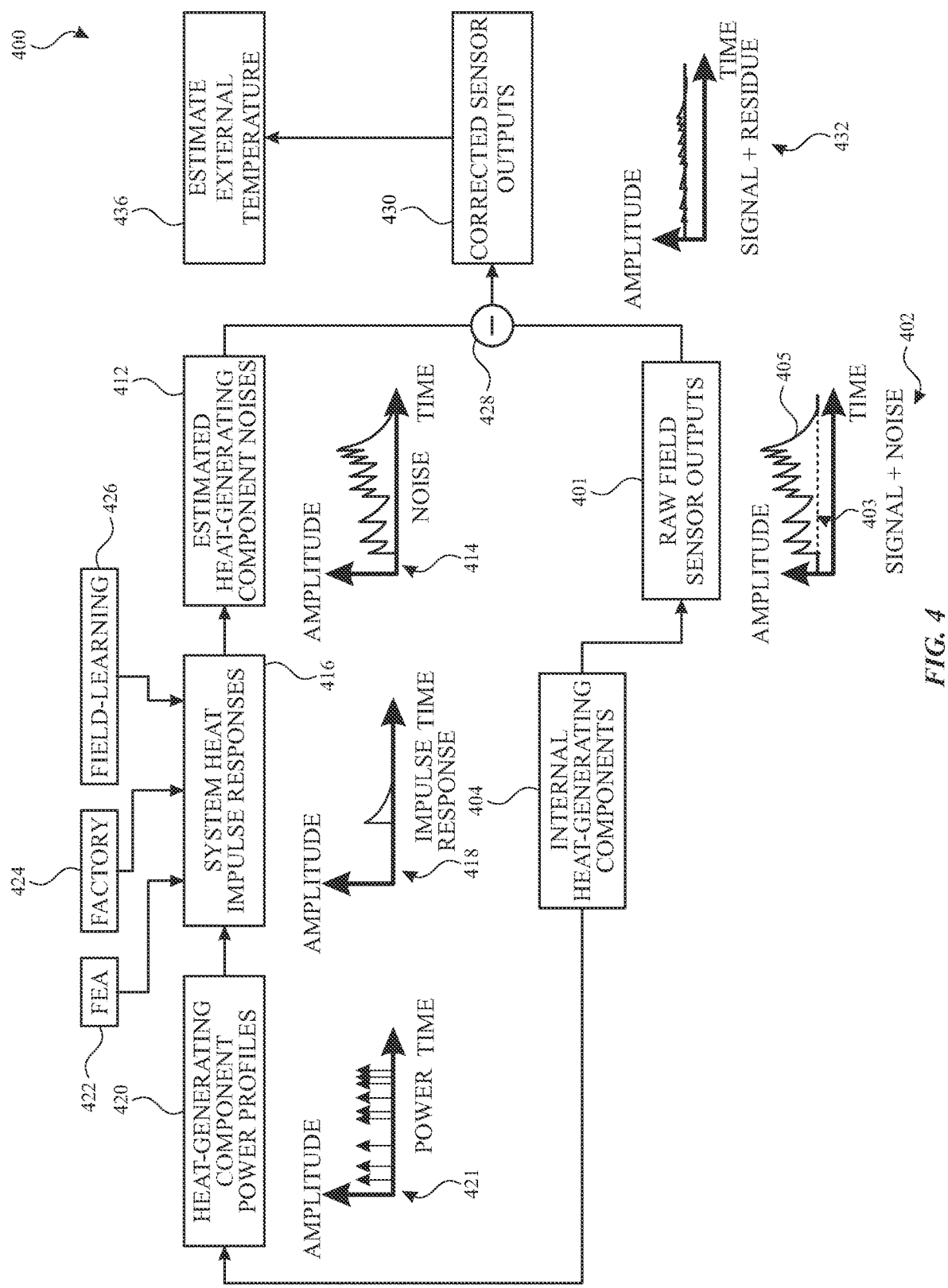
FIG. 4 illustrates a heat-generating component mitigation signal processing flow of the internal heat-generating component noise correction technique, in accordance with some examples of the present disclosure.

FIG. 4 illustrates a heat-generating component (e.g., thermal aggressor) mitigation signal processing flow (e.g., process 400) of the internal heat-generating component noise correction technique for estimating a temperature external to an electronic device (e.g., the electronic device 300 of FIG. 3), in accordance with some examples of the present disclosure.

Figure 5:
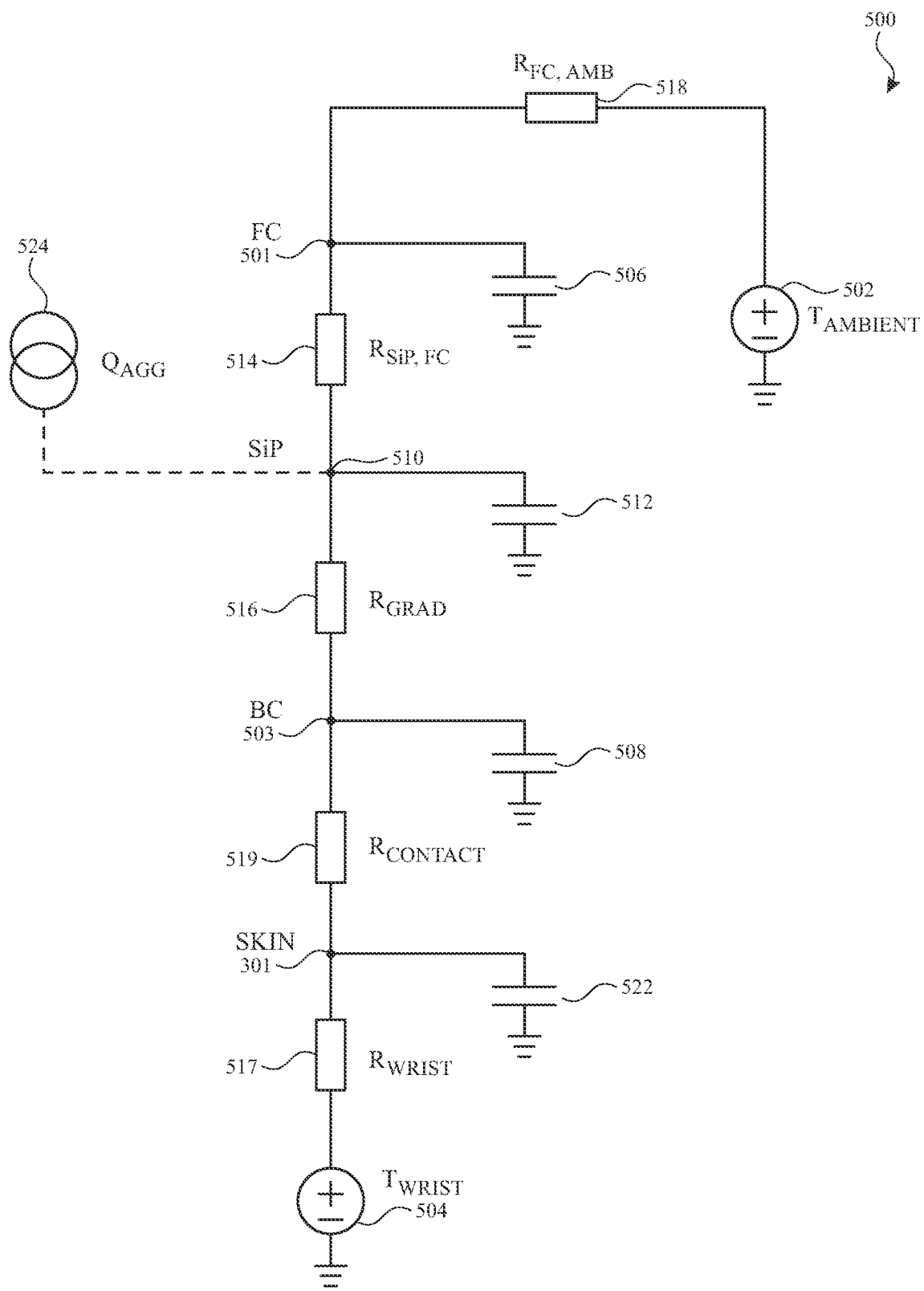
FIG. 5 illustrates simplified schematic view of electrical elements and electrical properties of the electrical elements that may be utilized in an execution of the internal heat-generating component noise correction technique, in accordance with some examples of the present disclosure.

Without the internal heat-generating component noise correction technique, estimating a temperature external to the device can include measuring raw temperatures using temperature sensors (block 401), and then using the raw temperature measurements optionally to estimate an external temperature using a thermal model (block 436), such as a heat flux model represented by circuit model 500 of FIG. 5. In some examples, the raw field sensor outputs (block 401) include outputs of temperature measurements acquired by one or more temperature sensors of an electronic device at one or more locations on the electronic device. However, as described herein, raw temperature measurements acquired by an electronic device (block 401) are optionally influenced by heat-generating components inside of the electronic device (block 404). For example, graph 402 illustrates aggressor noise from heat-generating components influencing raw temperature sensor measurements configured to measure a temperature external to the electronic device. Specifically, graph 402 shows signal data of temperature data (e.g., horizontal line representing the temperature signal) that is influenced by aggressor noise from heat-generating component(s) inside the electronic device (e.g., the horizontal line 403 represents temperature data without aggressor noise from heat-generating components, and deviation from the horizontal line 403, as indicated by the line 405, includes aggressor noise from the heat-generating components). As a result, the influence of the aggressor noise on the temperature measurements acquired by the one or more temperature sensor(s) may also influence an estimate of ambient or body temperature based on the temperature measurement(s) by the one or more temperature sensors (block 436).

The source of aggressor noise (block 404) may include one or more internal heat-generating components (e.g., thermal aggressors) in the electronic device that may influence a temperature measurement acquired by one or more temperature sensors of the electronic device. During an operation of the electronic device, one or more heat-generating components of the electronic device may dissipate energy in the form of heat. A few non-limiting example operations on the electronic device, which may cause a raw temperature measurement or temperature estimation to be influenced by heat dissipation from the heat-generating components, include a physiological signal acquisition operation (e.g., PPG signal acquisition using optical sensors) and a wireless communication operation (e.g., sending or receiving of data such as a text message or call via an Internet Protocol or a mobile network connection such as BLUETOOTH, near-field communication, WiFi, cellular), among other possibilities. It should be noted that other operations executed on the electronic device may cause a component of the electronic device to dissipate heat, and thus cause some components to be heat-generating components. Execution of the example operations may cause the heat-generating components of the electronic device involved in the operations to dissipate heat, which may influence a temperature measurement acquired by a temperature sensor of the electronic device.

As described herein, in some examples, the raw temperature measurements can be compensated for the dissipated heat (e.g., aggressor noise) to improve accuracy of estimations of a temperature external to the device such as an ambient temperature and/or a user's temperature (at block 436). The compensation can include estimating aggressor noise due to heat-generating components in the electronic device and subtracting the estimated internal aggressor noise from the raw field temperature sensor outputs (at block 428). Accordingly, accounting for heat generated by internal heat-generating components in the electronic device is desirable for accurately estimating a temperature external to the electronic device. The details of noise estimation are described below with respect to blocks 412, 416, and 420.

Process 400 includes determining (block 412) estimated heat-generating component (e.g., thermal aggressor) noises provided by heat-generating components (block 404) in the electronic device. Graph 414 illustrates an example of estimated heat-generating component noises provided by heat-generating components (block 404) in the electronic device over a time period. As shown in graph 414, in some examples, the estimated heat-generating component noises vary in magnitude over time (e.g., fluctuate), as an operation of the electronic device may involve utilization of one or more different heat-generating components that dissipates energy at different rates over time.

In some examples, the estimated heat-generating component noises are optionally determined (e.g., estimated) using impulse response(s) of heat-generating component(s) of the electronic device (block 416). In some examples, impulse responses of the heat-generating components of the electronic device can be determined (e.g., estimated) by determining power profiles of the heat-generating components from operations (e.g., the example operations) of the electronic device (block 420). Graph 418 illustrates an impulse response of a heat-generating component. As shown in the graph 418, the impulse response shows that in response to a power impulse (e.g., or current draw), the heat-generating component has an increase in temperature (e.g., an increase in thermal energy, which may cause energy of particles and/or objects surrounding the heat-generating component to increase temperature) and then decreases in temperature over time.

Components of the electronic device may draw current (and different amounts thereof) at different times during an operation of the electronic device. As such, the heat-generating components may have different power levels at different times during the operations by the electronic device. As an example, the graph 421 illustrates input power impulses provided to the heat-generating component at different times (e.g., 0.001 s, 0.01 s, 1 s, etc.). Some of the power output is dissipated as heat from the heat-generating component (e.g., graph 418), transiently. As another example, based on data, such a power log data of components of the electronic device (e.g., measured by power management circuitry 209 and/or power dissipation monitoring circuitry 213 of FIG. 2), power profiles can be assigned to the internal thermal aggressing components (e.g., to the heat-generating components). For example, during a physiological signal acquisition (e.g., heart rate, electrocardiogram, etc.), one or more components (e.g., the optical system) on the third printed circuit board 310 of FIG. 3 may draw current/use power at a first rate while a component on the second printed circuit board 308 of FIG. 3 may draw current/use power at a second rate different than the first rate. As such, power profile data corresponding to heat-generating components can be used to determine an impulse response corresponding to the components of the electronic device for use in estimating aggressor noises in a temperature measurement.

In some examples, the impulse responses of heat-generating components may be identified by simulation, such as finite element analysis (FEA) (block 422). In some examples, the impulse responses of heat-generating components may be empirically determined, for example, during manufacturing/testing process (indicated by "FACTORY" block 424). In some examples, the impulse responses of heat-generating components may be determined in real-time during field learning (block 426). For example, one or more temperature sensors in the electronic device (e.g., temperature sensor(s) 250 of FIG. 2) may be measured under controlled testing conditions to examine the impact of each of the heat-generating components of the electronic device (e.g., during various operations using the heat-generating components). For example, impacts of the power consumption of heat-generating components may be determined using lab characterizations of the heat-generating components (e.g., an impulse response, a rise time, a fall time, and amplitude measured for each heat-generating component at various respective power levels). The data or information characterizing the effects of heat generating components on a temperature measurement can be used for noise correction as described herein. In some examples, the data is stored in the electronic device. In some examples, the data can be used to model the impact of heat-generating components on the temperature sensors of the electronic device.

In some examples, various components of the electronic device may have different power profile data and different impulse response data. In some examples, some components of the electronic device have substantially similar power profile data, but different impulse response data due to varying electrical properties between the components. Such response data from the various internal components of the electronic device may be aggregated to determine a system heat of the electronic device in response to the one or more operations occurring on the electronic device. For example, a physiological signal acquisition operation may include sequences of operating a plurality of LEDs, and the response for the plurality of LEDs can be aggregated for the physiological signal acquisition operation (rather than treating each LED operation independently). In some examples, the impulse response data of the components of the electronic device can be acquired from a finite element analysis (FEA) (block 422), from testing during a manufactory or a testing stage of the electronic device (block 424), or based on data acquired during a field learning period (block 426). In some examples, data acquired during the field learning period includes data acquired during a machine learning operation configured to estimate thermal response data on an electronic device based on previous thermal response data on the specific electronic device (block 426) to determine an estimate of aggressor noise that may influence a temperature measurement. At block 428, the estimated heat-generating component noises (block 412) may be used to compensate the raw field temperature sensor outputs (block 401). For example, the estimated heat-generating component noises (from block 412) can be subtracted (at block 428) from the raw field sensor outputs (from block 401). The compensated, corrected sensor outputs can be used to estimate corrected temperature sensor outputs (block 430). As shown in graph 432, the temperature signal is smoother and is less influenced by thermal energy of the heat-generating components compared with the graph 402 (e.g., the noise is reduced and/or eliminated). The compensated, corrected sensor outputs can be used to estimate the external temperature (block 436).

FIG. 5 illustrates simplified schematic view of a circuit model 500 including representative electrical elements (e.g., resistances and capacitances) and electrical properties of the electrical elements that may be utilized in an execution of the internal heat-generating component noise correction technique, in accordance with some examples of the present disclosure. The internal heat-generating component noise correction technique may assist the electronic device in accurately reporting an estimated temperature measurement of $T_{Ambient}$ 502 (e.g., an ambient temperature) and/or $T_{Wrist}$ 504 (e.g., a temperature of a user).

Some of the nodes of circuit model 500 corresponds to portions of electronic device 300 of FIG. 3. Circuit model 500 of the electronic device includes a node representing the front crystal (e.g., FC 501, front crystal 302 of FIG. 3), a node representing a System-in-Package component system (e.g., SiP 510), and a node representing the back crystal (e.g., BC 503, back crystal 304 of FIG. 3). Circuit model 500 also includes a node representing the skin of the user (e.g., skin of the user 301 of FIG. 3). The external temperatures, $T_{Ambient}$ 502 and $T_{Wrist}$ 504, are represented by voltage sources coupled to ground. The circuit model 500 also includes thermal resistances and thermal capacitances. For example, each node in circuit model 500 has a thermal capacitance to ground. As shown, thermal capacitance 506 corresponds to the node of the FC 501, thermal capacitance 512 corresponds to the node of the SiP 510, thermal capacitance 508 corresponds to the node of the BC 503, and thermal capacitance 522 corresponds to the node of the skin of the user 301. Each node is coupled to the adjacent node(s) by a thermal resistance. For example, the thermal resistance in circuit model 500 include: a thermal resistance (e.g., $R_{SiP,FC}$ 514, FC) between the SiP 510 and the FC 501, a thermal resistance (e.g., $R_{Grad}$ 516) between the SiP 510 and the BC 503, a thermal resistance (e.g., $R_{FC,Amb}$ 518) between the FC 501 and outside of the electronic device 300, a thermal resistance (e.g., $R_{Contact}$ 519) between BC 503 and the skin of the user 301 (e.g., a wrist of a user), and a thermal resistance (e.g., $R_{Wrist}$ 517) of the skin of user 301 (e.g., between the external and internal portions of the skin).

In the illustrated example, the SiP 510 dissipates heat (e.g., $Q_{Agg}$ 524 as aggressor noise). Specifically, during operations on the electronic device, as the SiP 510 executes operations, the SiP 510 may dissipate some power as heat (e.g., $Q_{Agg}$ 524). $Q_{Agg}$ 524 may influence measurements of internal temperatures acquired by the electronic device (e.g., at node(s) corresponding to FC 501, BC 503 or SiP 510).

An ambient temperature (e.g., $T_{Ambient}$ 502) or body temperature ($T_{Wrist}$ 504) may be computed using this model. However, the accuracy of the estimate may be degraded by noise aggressors. For example, heat-generated by a heat-generating component (e.g., SiP 510) and/or other component of the electronic device 300 may cause measurements at one or more nodes to drift, thereby causing an error in a measurement of $T_{Ambient}$ 502 or $T_{Wrist}$ 504 due to influence of by aggressor noise from inside of the electronic device 300. Thus, it is desirable to account for $Q_{Agg}$ 524 when measuring temperature and estimating a temperature external to the electronic device to obtain an accurate temperature measurement/estimate. Specifically, by compensating a temperature measurement based on $Q_{Agg}$ 524 (e.g., an estimate of heat generated by SiP 510) to generate a second temperature (e.g., compensated temperature), and estimating a temperature external to the electronic device using the second temperature, a more accurate estimation of $T_{Ambient}$ 502 and/or $T_{Wrist}$ 504 may be determined.

Figure 6:
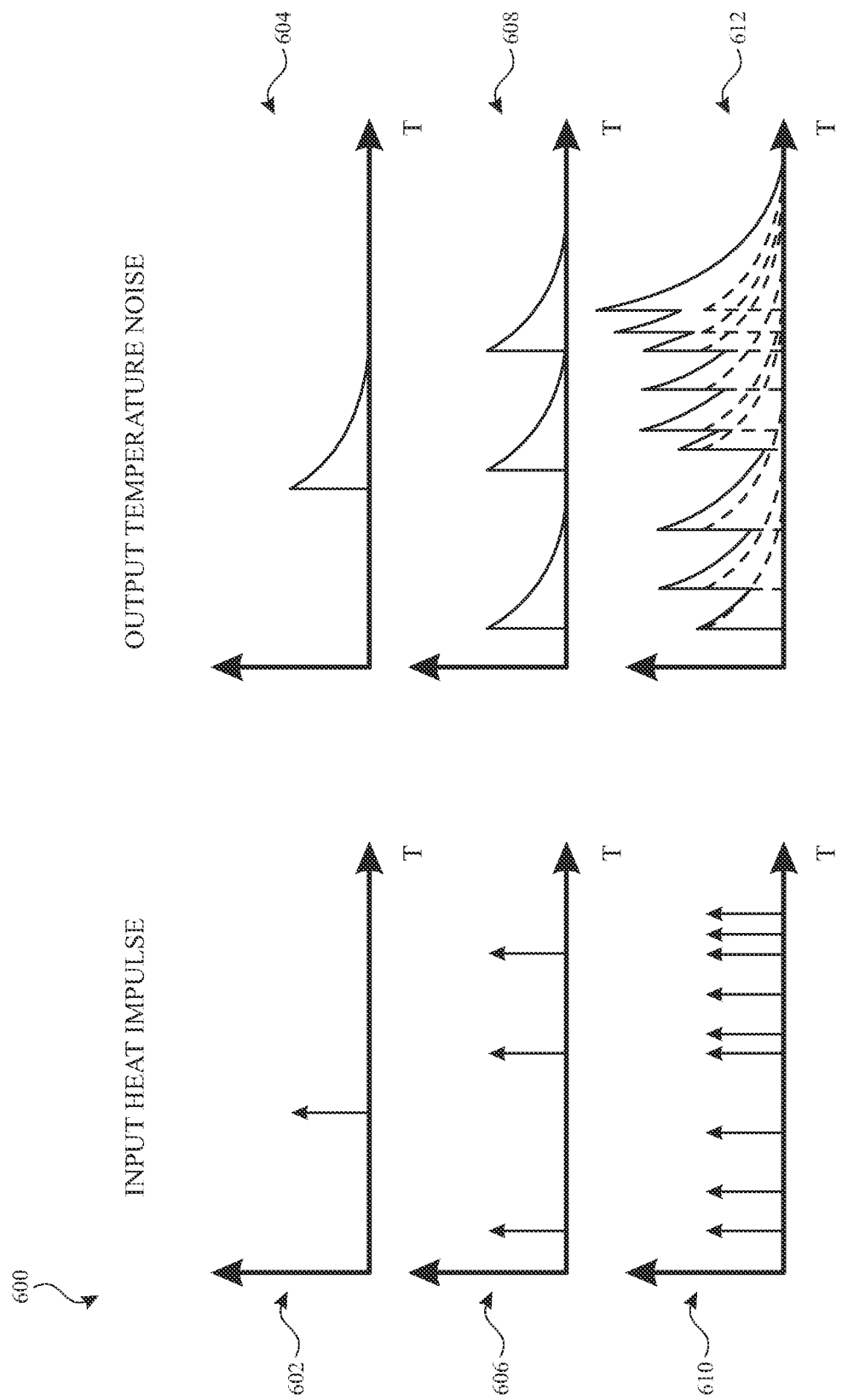
FIG. 6 illustrates graphs corresponding to heat impulses provided to heat-generating components and resulting impulse responses, in accordance with some examples of the present disclosure.

FIG. 6 illustrates graphs 600 corresponding to heat impulses provided to heat-generating components and resulting impulse responses, in accordance with some examples of the present disclosure. Specifically, FIG. 6 illustrates a simplified graphical example of a heat-generating component of the electronic device receiving input heat impulses and outputting temperature noise (e.g., impulse responses) corresponding to the input heat impulses, in accordance with some examples of the present disclosure.

In the illustrated example of graph 602, the heat-generating component (e.g., SiP 510 of FIG. 5, a light emitter 204 of FIG. 2, etc.) receives a single heat impulse (e.g., an energy input) and the heat-generating component dissipates some of the energy from the heat impulse as heat, as shown by graph 604. The heat input may correspond to an impulse of power received during an operation on the electronic device (e.g., the example operations discussed with reference to FIG. 4). As the heat-generating component utilizes energy from the heat impulse to perform the operation, some of the energy raises an amount of thermal energy of the heat-generating component. The thermal energy from the heat impulse decreases over a time span after the input heat impulse is received.

In graph 606, the heat-generating component (e.g., SiP 510 of FIG. 5, a light emitter 204 of FIG. 2, etc.) receives an input heat impulse at three different times. The impulse response graph of the heat-generating component shows the three different impulse responses corresponding to the three different heat impulses at the three different times, as shown by graph 606. As shown in graphs 606 and 608, when a time span between input heat impulses is greater than a threshold time span (e.g., a time span corresponding to a respective impulse response), successive heat impulses may not overlap.

In some examples, when the time span between impulses is less than the threshold time space, the effects of successive heat pulses may overlap. In some examples, a superposition of heat responses may be used to estimate the impact of thermal energy released by the multiple heat-generating components and/or multiple heat-generating events.

Graphs 610 and 612 demonstrate how a successive impulse response may be combined by superposition, in accordance with some examples. In graph 610, the heat-generating component (e.g., SiP 510 of FIG. 5, a light emitter 204 of FIG. 2, etc.) receives an input heat impulse at different times (e.g., nine shown). As illustrated, the time span between at least some of the input impulses is less than the threshold time span (e.g., the time span corresponding to a respective impulse response). As a result, graph 612 illustrates a superposition of heat responses (shown in solid line) affecting the thermal energy (and corresponding) aggressor noise outputted by the heat-generating component. For reference the individual heat responses are shown in dashed line. Accordingly, the internal heat-generating component noise correction technique may compensate for aspects of aggressor noise that may or may not be influenced significantly by superposition of heat responses. In some examples, the system may or may not use superposition to estimate heat-generating component noise. In some examples, individual components of heat-generating component noise can be estimated and subtracted. In some examples, some or all of the individual components of heat-generating component noise can be combined by superposition and then subtracted.

Although the estimation of thermal energy described above utilizes impulse response and superposition (e.g., a convolution of power with the impulse), it should be noted that other methods are optionally used (additionally or alternatively) to estimate the thermal error contribution of a subsystem in the electronic device (e.g., the impact of aggressor noise in the electronic device from one or more heat-generating components in the electronic device). These estimation methods optionally include directly estimating the above-recited convolution results with exponential settling functions and/or using an infinite impulse response (IIR) filter function on the input power and multiplier, among other possibilities.

Figure 7:
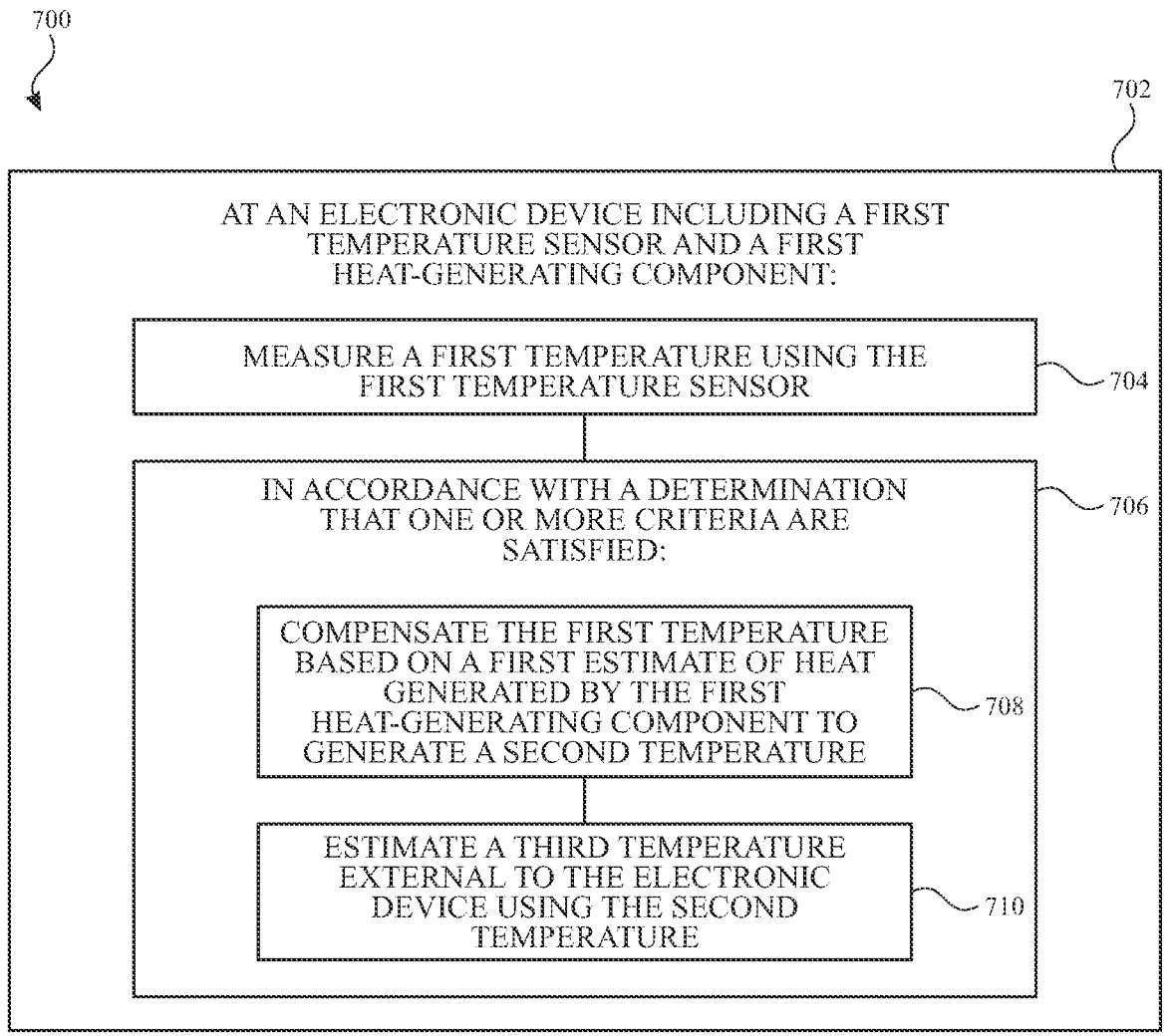
FIG. 7 illustrates a flowchart of a method for estimating an external temperature using the internal heat-generating component noise correction technique for estimating measurements acquired by the temperature sensing system, in accordance with some examples of the present disclosure.

FIG. 7 illustrates a flowchart of a method for estimating an external temperature using the internal heat-generating component noise correction technique for estimating measurements acquired by the temperature sensing system, in accordance with some examples of the present disclosure. In some examples, the method 700 is performed at an electronic device including a temperature sensor and a heat-generating component (operation 702).

The method 700 includes measuring a first temperature using a first temperature sensor (operation 704), such a temperature sensor 250 of FIG. 2 or one or more temperature sensor(s) 316a-c, 318a, 318b, 320a, 320b of FIG. 3. For example, the first temperature sensor may be node in circuit model 500 of FIG. 5 (e.g., a temperature sensor 316a corresponds to FC 501, a temperature sensor 316b corresponds to SiP 520, a temperature sensor 320b corresponds to BC 503.

The method includes, in accordance with a determination that one or more criteria are satisfied (operation 706), compensating the first temperature based on a first estimate of heat generated by the first heat-generating component to generate a second temperature (operation 708). In some examples, the satisfaction of the one or more criteria can correspond to an instance where the thermal impact is greater than a threshold so as to introduce more than a threshold drift (e.g., 0.01%, 0.1%, 1%, etc.) and/or for more than a threshold period of time (e.g., 0.005 s, 0.01 s, 1 s, 15 s, 50 s) in the temperature measurement acquired by the first temperature sensor. As a result, the compensation may occur when it is needed to correct drift in the temperature measurement due to aggressor noise exceeding the threshold. The threshold(s) can be set by a designer (e.g., an engineer) in accordance with a drift specification for the electronic device. In some examples, the determination is made at the electronic device (e.g., using host processor 210, power dissipation monitoring circuitry 213, and/or program storage 202 of FIG. 2). In some examples, the first estimate of heat generated by the first heat-generating component is determined using heat impulse response data of the first heat-generating component acquired during a testing of the electronic device and/or during a testing of the first heat-generating component. In some examples, the first estimate of heat fluctuates over time. As such, the aggressor noise may likewise fluctuate over time. Thus, compensating the first temperature based on the first estimate of heat generated by the first heat-generating component optionally accounts for transient thermal effects in the electronic device.

The method 700 also includes, in accordance with a determination that one or more criteria is satisfied, estimating a third temperature external to the electronic device using the second, compensated temperature (operation 710). In some examples, estimating a third temperature external to the electronic device using the second temperature includes subtracting the aggressor noise signal of the heat-generating component from the first temperature (e.g., temperature signal) to generate the third temperature.

In some examples, the method 700 also includes displaying the third temperature external to the electronic device on a display of the electronic device. For example, a user may wish to view the user's body temperature or ambient temperature, as reported on a display of the electronic device.

Although method 700 illustrated in FIG. 7 includes a first temperature sensors, it is understood that, in some examples, a similar compensation can be provided to multiple temperature sensors of a device. In some examples, the electronic device includes a second temperature sensor, different than the first temperature sensor. In some examples, the method 700 includes measuring a fourth temperature using the second temperature sensor. For example, the electronic device may measure the first temperature using the first temperature sensor at a first time and then use the second temperature sensor to measure the fourth temperature at the first time or at a second time. Both the first temperature and the second temperature may be influenced by thermal noise from one or more heat generating components. In some examples, the method 700 includes, in accordance with the determination that the one or more criteria are satisfied, compensating the fourth temperature based on a second estimate of heat generated by a second heat generating component to generate a fifth temperature and estimating the third temperature external to the electronic device using the second temperature and the fifth temperature. For example, the second estimate of heat generated by the first heat-generating component for the second temperature sensor is optionally different (e.g., greater than or less than) or equal to the first estimate of heat generated by the first heat-generating component for the first temperature sensor. By estimating the third temperature external to the electronic device using the compensated second temperature and the compensated fifth temperature, the third temperature may become a more accurate temperature estimate of a temperature external to the electronic device.

Although method 700 illustrated in FIG. 7 includes a first heat-generating component, it is understood that, in some examples, compensation can be provided to reduce or remove aggressor noise due to multiple heat-generating components of a device (on one or more temperature measurements). In some examples, the electronic device includes a second heat-generating component, different than the first heat-generating component. In some examples, in accordance with the determination that the one or more criteria are satisfied, the method 700 includes compensating the first temperature based on the first estimate of heat generated by the first heat-generating component and a second estimate of heat generated by the second heat-generating component to generate the second temperature. By compensating the first temperature based on the first estimate of heat generated by the first heat-generating component and the second estimate of heat generated by the second heat-generating component to generate the second temperature, thermal noise in the electronic device from the two (or more than two) heat-generating components can be accounted for when estimating a temperature external to the electronic device.

In some examples, the method 700 includes compensating the first temperature based on a location of the first heat-generating component relative to the first temperature sensor to generate the second temperature. For example, an amount of heat generated by the first heat-generating component that is transferred to the first temperature sensor (and thus influencing the first temperature) may be based on a location of the first heat-generating component relative to the first temperature sensor (and to the other structural/material details for the implementation of the electronic device). As such, the method 700 accounts for the location of the first heat-generating component and the electronic device's construction, as well as the amount of heat dissipated by the heat-generating component, to determine a compensation amount for the first temperature. Indeed, the method of the internal heat-generating component noise correction technique optionally accounts for thermal transfer effects that occur in the electronic device.

In some examples, the method 700 includes the one or more criteria including a criterion that is satisfied when the first estimate of heat generated by the first heat-generating component is above a threshold amount of heat. For example, the first estimate of heat generated by the first heat-generating component may be above the threshold amount of heat during an operation (e.g., an event) such as the example operations described with reference to FIG. 4 but may be below the threshold amount of heat during a second operation on the electronic device. During the second operation, thermal noise from the first heat-generating component may not cause a significant effect on the first temperature. For example, during a 5G pinging operation of the electronic device, the one or more criteria may not be satisfied, whereas during a 5G data transfer of a large data file, the one or more criteria may be satisfied. Although, in some examples, the 5G pinging operation of the electronic device may cause the first estimate of heat generated by the first heat-generating component to be satisfied.

In some examples, the method 700 includes the one or more criteria including a criterion that is satisfied when a time duration of an operation (e.g., event) that causes activation of the first heat-generating component is above a threshold time duration. For example, in some examples, the receiving of data at the electronic device such as a short text message may not meet the time duration criteria of activation of a processor that receives and processes the text message. Although, in some examples, the time duration criteria may be satisfied in response receiving of the data.

In some examples, the method 700 includes estimating a thermal effect of the heat generated by the first heat-generating component on the first temperature measurement measured by the first temperature sensor. In some examples, a portion of the first estimate of heat generated by the first heat-generating component affects the first temperature measured by the first temperature sensor. As such, estimating the thermal effect of the heat generated by the first heat-generating component on the first temperature measurement allows for a more accurate estimated third temperature than simply an estimation based on the first estimate of heat generated by the first heat-generating component. In some examples, the method 700 includes storing the thermal effect of the heat generated by the first heat-generated component for use in an estimation of a temperature external to the electronic device. For example, the electronic device may store in a memory or storage, such as the program storage 202 of FIG. 2, events (e.g., example operations discussed with reference to FIG. 4) on the electronic device that may cause the first heat-generating component to dissipate heat, and an estimation of how the dissipated heat may affect the first temperature. Such data may be accessed by the processor (e.g., the host processor 210 of FIG. 2) to perform one or more operations of the method 700. In some examples, the first estimate of heat generated by the first heat-generating component (e.g., of method 700) is based on data indicative of an effect of heat on temperature measurements measured by the first temperature sensor (e.g., finite element analysis, testing).

In some examples, the method 700 includes the electronic device including a plurality of heat-generating components including the first heat-generating component (e.g., the SiP 312 of FIG. 3 and the component 314 of FIG. 3). In some examples, compensating the first temperature based on the first estimate of heat generated by the first heat-generating component (operation 708), includes compensating the first temperature based on a second estimate of heat generated by the plurality of heat-generating components, wherein the second estimate of heat corresponds to a superposition of estimates of heat for each of the plurality of heat-generating components including the first estimate of heat generated by the first heat-generating component. In some examples, the method 700 includes operations that include a powering up of the first heat-generating component or a series of successive powering up and powering down of the first heat-generating component for a period of time, such as an operation of the example operations, as discussed with reference to FIG. 4, including usage of the first heat-generating component. As discussed with reference to graphs 610, 612 of FIG. 6, in some examples, thermal noise may be superimposed upon successive power inputs (e.g., powering up of the component) that causes additional thermal responses. As such, the internal heat-generating component noise correction technique may compensate for aspects of thermal noise that may be influenced by superposition of heat responses.

In some examples, the method 700 includes monitoring current draw or power consumption by the first heat-generating component, wherein the estimate of heat generated by the first heat-generating component is based on the current draw or the power consumption by the heat-generating component, such as via the power dissipation monitoring circuitry 213 of FIG. 2.

In some examples, the method 700 includes in accordance with a determination that one or more criteria are not satisfied, estimating the third temperature external to the electronic device using the first temperature.

In some examples, the method 700 can perform compensation and/or estimate the third temperature without evaluating the one or more criteria (e.g., regular or continuous compensation during external temperature measurements). For example, the electronic device (e.g., the computing system 200 of FIG. 2) can include a first temperature sensor and the first heat-generating component. The electronic device can measure a first temperature using the first temperature sensor, compensate the first temperature based on a first estimate of heat generated by the first heat-generating component to generate a second temperature, and estimate a third temperature external to the electronic device using the second temperature.

Some examples of the present disclosure are directed to an electronic device configured to perform method 700 with any of the above modifications. The electronic device can include a first temperature sensor, a memory including processor-executable instructions including instructions (e.g., for performing the disclosed internal heat-generating component noise correction technique), and one or more processors configured to perform the processor-executable instructions, such as the computing system 200 of FIG. 2. The processor-executable instructions include instructions for measuring a first temperature using the first temperature sensor, and in accordance with a determination that one or more criteria are satisfied, compensating the first temperature based on a first estimate of heat generated by a first heat-generating component or by the one or more processors to generate a second temperature, and estimating a third temperature external to the electronic device using the second temperature.

In some examples, the electronic device (e.g., the computing system 200 of FIG. 2) includes a second temperature sensor, different than the first temperature sensor. In some examples, the instructions include measuring a fourth temperature using the second temperature sensor. For example, the instructions may instructions for measuring the first temperature using the first temperature sensor at a first time and then using the second temperature sensor to measure the fourth temperature at the first time or at a second time. Both the first temperature and the second temperature may be influenced by thermal noise from one or more heat generating components. In some examples, the instructions include, in accordance with the determination that the one or more criteria are satisfied, compensating the fourth temperature based on a second estimate of heat generated by a second heat generating component to generate a fifth temperature and estimating the third temperature external to the electronic device using the second temperature and the fifth temperature. For example, the second estimate of heat generated by the first heat-generating component for the second temperature sensor is optionally different (e.g., greater than or less than) or equal to the first estimate of heat generated by the first heat-generating component for the first temperature sensor. By estimating the third temperature external to the electronic device using the compensated second temperature and the compensated fifth temperature, the third temperature may become a more accurate temperature estimate of a temperature external to the electronic device.

In some examples, the electronic device (e.g., the computing system 200 of FIG. 2) includes a second heat-generating component or second one or more processors, different from the first heat-generating component and the one or more processors. In some examples, the instructions include instructions for, in accordance with the determination that the one or more criteria are satisfied, compensating the first temperature based on the first estimate of heat generated by the first heat-generating component and a second estimate of heat generated by the second heat-generating component to generate the second temperature. By compensating the first temperature based on the first estimate of heat generated by the first heat-generating component and the second estimate of heat generated by the second heat-generating component to generate the second temperature, thermal noise in the electronic device from the two (or more than two) heat-generating components can be accounted for when estimating a temperature external to the electronic device.

In some examples, the electronic device (e.g., the computing system 200 of FIG. 2) includes circuitry configured to measure power consumption of the first heat-generating component (e.g., the power management circuitry 209 of FIG. 2).

In some examples, the first heat-generating component is a system-in-package (SiP) component, such as the SiP 510 of FIG. 5, including the one or more processors.

In some examples, the first heat-generating component includes a light emitting diode (LED), such as the light emitters 204 of FIG. 2.

Some examples of the present disclosure are directed to a non-transitory computer readable storage medium storing programs or instructions, which when executed, perform method 700 with any of the above modifications. In some examples, the internal heat-generating component noise correction technique is stored on a non-transitory computer readable storage medium storing one or more programs, such as the program storage 202 of FIG. 2. The one or more programs include instructions, which when executed by a processor (e.g., executed by processing circuitry) of an electronic device including a first temperature sensor and a first heat-generating component, cause the electronic device to perform operations including measuring a first temperature using the first temperature sensor, and in accordance with a determination that one or more criteria are satisfied, compensating the first temperature based on a first estimate of heat generated by the first heat-generating component to generate a second temperature, and estimating a third temperature external to the electronic device using the second temperature. In some examples, the instructions include instructions for performing one or more of operations of the method 700 with any of the above modifications indicated with regards to the method 700.

Various aspects of the disclosed examples, such as aspects of the examples illustrated in the drawings and details in this disclosed may be combined. In addition, although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. A method comprising:
at an electronic device including a first temperature sensor and a first heat-generating component:
measuring a first temperature using the first temperature sensor; and
in accordance with a determination that one or more criteria are satisfied:
compensating the first temperature based on a first estimate of heat generated by the first heat-generating component to generate a second temperature; and
estimating a third temperature external to the electronic device using the second temperature.

2. The method of claim 1, wherein the electronic device includes a second temperature sensor, different than the first temperature sensor, and wherein the method comprises:
measuring a fourth temperature using the second temperature sensor; and
in accordance with the determination that the one or more criteria are satisfied:
compensating the fourth temperature based on a second estimate of heat generated by a second heat-generating component to generate a fifth temperature; and
estimating the third temperature external to the electronic device using the second temperature and the fifth temperature.

3. The method of claim 1, wherein the electronic device includes a second heat-generating component, different than the first heat-generating component, and wherein the method comprises:
in accordance with the determination that the one or more criteria are satisfied:
compensating the first temperature based on the first estimate of heat generated by the first heat-generating component and a second estimate of heat generated by the second heat-generating component to generate the second temperature.

4. The method of claim 1, comprising:
compensating the first temperature based on a location of the first heat-generating component relative to the first temperature sensor to generate the second temperature.

5. The method of claim 1, wherein the one or more criteria include a criterion that is satisfied when the first estimate of heat generated by the first heat-generating component is above a threshold amount of heat.

6. The method of claim 1, wherein the one or more criteria include a criterion that is satisfied when a time duration of an event that causes activation of the first heat-generating component is above a threshold time duration.

7. The method of claim 1, comprising:
estimating a thermal effect of the heat generated by the first heat-generating component on the first temperature measured by the first temperature sensor.

8. The method of claim 7, comprising:
storing the thermal effect of the heat generated by the first heat-generated component for use in an estimation of a temperature external to the electronic device.

9. The method of claim 1, wherein the electronic device comprises a plurality of heat-generating components including the first heat-generating component, and wherein compensating the first temperature based on the first estimate of heat generated by the first heat-generating component comprises:
compensating the first temperature based on a second estimate of heat generated by the plurality of heat-generating components, wherein the second estimate of heat corresponds to a superposition of estimates of heat for each heat-generating component of the plurality of heat-generating components including the first estimate of heat generated by the first heat-generating component.

10. The method of claim 1, comprising:
monitoring current draw or power consumption by the first heat-generating component, wherein the first estimate of heat generated by the first heat-generating component is based on the current draw or the power consumption by the first heat-generating component.

11. The method of claim 1, comprising:
in accordance with a determination that the one or more criteria are not satisfied:
estimating the third temperature external to the electronic device using the first temperature.

12. The method of claim 1, wherein compensating the first temperature to generate the second temperature comprises removing the first estimate of heat generated by the first heat-generating component from the first temperature.

13. An electronic device, comprising:
a first temperature sensor; and
one or more processors configured to perform operations comprising:

measuring a first temperature using the first temperature sensor; and
in accordance with a determination that one or more criteria are satisfied:
compensating the first temperature based on a first estimate of heat generated by a first heat-generating component or by the one or more processors to generate a second temperature; and
estimating a third temperature external to the electronic device using the second temperature.

14. The electronic device of claim 13, comprising a second temperature sensor, different than the first temperature sensor, and wherein the operations comprise:
measuring a fourth temperature using the second temperature sensor; and
in accordance with the determination that the one or more criteria are satisfied:
compensating the fourth temperature based on a second estimate of heat generated by a second heat-generating component to generate a fifth temperature; and
estimating the third temperature external to the electronic device using the second temperature and the fifth temperature.

15. The electronic device of claim 13, comprising a second heat-generating component or second one or more processors, different from the first heat-generating component and the one or more processors, wherein the operations comprise:
in accordance with the determination that the one or more criteria are satisfied:
compensating the first temperature based on the first estimate of heat generated by the first heat-generating component and a second estimate of heat generated by the second heat-generating component to generate the second temperature.

16. The electronic device of claim 13, comprising:
circuitry configured to measure power consumption of the first heat-generating component.

17. The electronic device of claim 13, wherein the first heat-generating component is a system-in-package (SiP) component including the one or more processors.

18. The electronic device of claim 13, wherein the first heat-generating component includes a light emitting diode (LED).

19. A non-transitory computer readable storage medium storing one or more programs, the one or more programs comprising instructions, which when executed by a processor, cause an electronic device to perform operations comprising:
measuring a first temperature using a first temperature sensor of the electronic device; and
in accordance with a determination that one or more criteria are satisfied:
compensating the first temperature based on a first estimate of heat generated by a first heat-generating component of the electronic device to generate a second temperature; and
estimating a third temperature external to the electronic device using the second temperature.

20. The non-transitory computer readable storage medium of claim 19, wherein the electronic device includes a second temperature sensor, different from the first temperature sensor, and wherein the operations comprise:
measuring a fourth temperature using the second temperature sensor; and
in accordance with the determination that the one or more criteria are satisfied:
compensating the fourth temperature based on a second estimate of heat generated by the second heat-generating component to generate a fifth temperature; and
estimating the third temperature external to the electronic device using the second temperature and the fifth temperature.

* * * * *